United States Patent [19]

Bresser et al.

[11] Patent Number: 4,576,984
[45] Date of Patent: Mar. 18, 1986

[54] STABILIZER COMPOSITIONS FOR PVC RESINS

[75] Inventors: Robert E. Bresser, Sharonville; Keith A. Mesch; Karl R. Wursthorn, both of Cincinnati, all of Ohio

[73] Assignee: Morton Thiokol, Inc., Chicago, Ill.

[21] Appl. No.: 569,544

[22] Filed: Jan. 10, 1984

Related U.S. Application Data

[63] Continuation of Ser. No. 345,830, Feb. 2, 1982, abandoned, which is a continuation-in-part of Ser. No. 238,298, Feb. 26, 1981, abandoned.

[51] Int. Cl.$^4$ .............................................. C08K 5/58
[52] U.S. Cl. ................................ 524/182; 252/400 R; 524/180; 524/181; 524/303; 524/304; 524/330; 524/333; 524/392
[58] Field of Search ............... 524/180, 181, 182, 333, 524/330, 303, 304, 392; 252/400 R, 404

[56] References Cited

U.S. PATENT DOCUMENTS

| | | | |
|---|---|---|---|
| 2,707,178 | 4/1955 | Wilson | 524/304 |
| 2,809,956 | 10/1957 | Mack et al. | 260/45.75 |
| 2,954,362 | 9/1960 | Wilson | 524/181 |
| 3,063,963 | 11/1962 | Wooten et al. | 524/180 |
| 3,067,166 | 12/1962 | Zaremsky | 260/45 |
| 3,103,500 | 9/1963 | Tholstrup et al. | 524/330 |
| 3,144,422 | 8/1964 | Homberg | 524/302 |
| 3,167,527 | 1/1965 | Hechenbleikner et al. | 524/180 |
| 3,242,133 | 3/1966 | Lindsey | 524/392 |
| 3,313,761 | 4/1967 | Barnes et al. | 260/31.8 |
| 3,413,264 | 11/1968 | Hechenbleikner et al. | 524/180 |
| 3,442,806 | 5/1969 | O'Neill | 252/46.4 |
| 3,483,159 | 12/1969 | Kauder | 260/45.75 |
| 3,503,924 | 3/1970 | Pollock | 524/180 |
| 3,507,827 | 4/1970 | Pollock | 524/180 |
| 3,534,121 | 10/1970 | Eggensperger | 260/880 |
| 3,542,825 | 11/1970 | Hoye | 260/429.7 |
| 3,553,163 | 1/1971 | Spacht | 260/45.95 |
| 3,565,931 | 2/1971 | Brecker | 260/429.7 |
| 3,640,950 | 2/1972 | Weisfeld | 260/45.75 K |
| 3,674,737 | 7/1972 | Brecker et al. | 260/45.75 R |
| 3,715,333 | 2/1973 | Larkin | 260/45.75 R |
| 3,758,341 | 9/1973 | Wowk | 260/429.7 |
| 3,758,536 | 9/1973 | Wowk | 260/429.7 |
| 3,758,537 | 9/1973 | Wowk | 260/429.7 |
| 3,810,868 | 5/1974 | Weisfeld | 260/45.75 K |
| 3,822,233 | 7/1974 | Stapfer | 260/45.75 K |
| 3,875,084 | 4/1975 | Weil | 260/2 EC |
| 3,887,519 | 6/1975 | Weisfeld et al. | 260/45.75 K |
| 3,890,277 | 6/1975 | Kugele et al. | 524/180 |
| 3,894,989 | 7/1975 | Collins | 260/45.75 S |
| 3,928,285 | 12/1975 | Gough | 524/181 |
| 3,933,600 | 1/1976 | Wowk | 252/406 |
| 3,943,099 | 3/1976 | Bakassian et al. | 260/45.75 E |
| 3,970,678 | 7/1976 | Molt | 260/429.7 |
| 3,972,908 | 8/1976 | Collins | 260/429.7 |
| 3,979,359 | 9/1976 | Kugele et al. | 260/45.75 S |
| 4,029,618 | 6/1977 | Dieckmann | 260/23 X |
| 4,062,881 | 12/1977 | Kugele | 524/181 |
| 4,098,763 | 7/1978 | Starnes | 260/45.7 S |
| 4,111,903 | 9/1978 | Hoch et al. | 524/180 |
| 4,118,371 | 10/1978 | Kugele | 524/181 |
| 4,122,064 | 10/1978 | Scheidl et al. | 260/45.75 S |
| 4,128,530 | 12/1978 | Cottman | 260/45.95 C |
| 4,254,017 | 3/1981 | Dworkin et al. | 524/180 |
| 4,255,320 | 3/1981 | Brecker et al. | 260/45.75 |
| 4,274,999 | 6/1981 | Burley et al. | 260/45.75 S |
| 4,290,942 | 9/1981 | Schneider et al. | 524/392 |
| 4,314,934 | 2/1982 | Smith et al. | 524/181 |
| 4,360,619 | 11/1982 | Kugele et al. | 524/181 |

FOREIGN PATENT DOCUMENTS

| | | |
|---|---|---|
| 0018045 | 10/1980 | European Pat. Off. |
| 2316280 | 1/1977 | France |
| 2333017 | 6/1977 | France |
| 2434835 | 3/1980 | France |
| 16435 | 10/1962 | Japan |
| 18213 | 5/1972 | Japan |
| 52-38556 | 3/1977 | Japan |
| 55-31900 | 3/1980 | Japan |
| 55-160044 | 12/1980 | Japan |
| 56-2336 | 1/1981 | Japan |
| 56-844 | 1/1981 | Japan |
| 2286 | 1/1981 | Japan |
| 771857 | 4/1957 | United Kingdom |
| 827393 | 2/1960 | United Kingdom |
| 874574 | 8/1961 | United Kingdom |
| 991763 | 5/1965 | United Kingdom |
| 1001344 | 8/1965 | United Kingdom |
| 1117652 | 6/1968 | United Kingdom |
| 1349913 | 9/1971 | United Kingdom |
| 1321157 | 6/1973 | United Kingdom |
| 1502073 | 2/1978 | United Kingdom |

OTHER PUBLICATIONS

Fernand Chevassus and Roger Broutelles: The Stabilization of Polyvinyl Chloride (1963), pp. 56–73, St. Martin's Press, N.Y.

Christian Stapfer et al., "Antioxidative Stabilization of Polyvinyl Chloride", Polymer Preprints, (American Chemical Society, Polymer Chemistry Division), Mar. 1971, vol. 12, No. 1, pp. 795–802.

Parker et al., "The Ligand Exchange Reaction of Some Dialkyltin Dimercaptides and Dicarboxylates with Dialkytin Dichlorides," ACS Advances in Chemistry Series 169, 363–373, (1978).

(List continued on next page.)

Primary Examiner—Veronica P. Hoke
Attorney, Agent, or Firm—Richard J. Sheridan; Gerald K. White

[57] ABSTRACT

Compositions which are effective in stabilizing polymers against the deteriorative effects of heat are provided comprising (1) a mono-organotin compound or mixture of mono-organotin compounds, (2) a mercaptan-containing organic compound or mixture of mercaptan-containing organic compounds, and, optionally (3) a diorganotin compound or mixture of diorganotin compounds. Also provided are polymer compositions containing said stabilizers and articles of manufacture made from said stabilized polymer compositions.

5 Claims, No Drawings

OTHER PUBLICATIONS

Wirth et al, The Effect of Organotin Chlorides on the Thermal Stability of PVC," Journal of Vinyl Technology, vol. 1, No. 1, pp. 51–54, (Mar. 1979).

Bellinger et al., "Stabilization of Poly(vinyl chloride) by Dibutyltin Thioglyculate Park 1: Structure and Composition Changes Which Occur During Processing".

Burley et al., "A Possible Mechanism to Explain the Synergistic Effects Exhibited by Mixtures of Alkyltin Mercaptoesters as Stabilizers for PVC," Polymer Degradation and Stability 3, pp. 285–294, (1980–1981).

Klemchuck, "Pol(vinyl chloride) Stabilization Mechanisms," ACS Advances in Chemistry Series, 85,1, 1968.

Starnes et al., "Chemical Stabilization of Poly(vinyl chloride) by Prior Reaction with Di(n-butyl)tin bis(-n-dodecyl mercaptide), Macromolecules, vol. 9, No. 4, p. 633, (Jul.–Aug. 1976).

STABILIZER COMPOSITIONS FOR PVC RESINS

This application is a continuation of application Ser. No. 345,830, filed Feb. 2, 1982, now abandoned which is in turn a continuation-in-part of Ser. No. 238,298, filed Feb. 26, 1981 now abandoned.

FIELD OF THE INVENTION

This invention relates to stabilizer compositions containing (1) a mono-organotin compound or mixture of monoorganotin compounds, (2) a mercaptan-containing organic compound or mixture of mercaptan-containing organic compounds, and, optionally (3) a diorganotin compound or mixture of diorganotin compounds. This invention also relates to polymer compositions containing (1) a polymer normally susceptible to heat induced deterioration, (2) a monoorganotin compound or mixture of mono-organotin compounds, (3) a mercaptan-containing organic compound or mixture of mercaptan-containing organic compounds, and, optionally, (4) a diorganotin compound or mixture of diorganotin compounds. This invention further relates to articles of manufacture, e.g. pipe, made from stabilized polymer compositions comprising (1) a polymer normally susceptible to heat induced deterioration, (2) a mono-organotin compound or mixture of mono-organotin compounds, (3) a mercaptan-containing organic compound or mixture of mercaptan containing organic compounds, and, optionally, (4) a diorganotin compound or mixture of diorganotin compounds.

BACKGROUND OF THE INVENTION

Organotin compounds, particularly useful as stabilizers for halogen containing polymers, are well-known in the art. These organotin compounds can provide stabilization of such polymers when used alone or in combination with various compounds. For example, U.S. Pat. No. 3,503,924 to M. W. Pollock discloses stabilizers for polyvinyl chloride resins which are mixtures containing a diorganotin mercaptide and a minor amount of an alpha-mercapto acid. Pollock also discloses, in U.S. Pat. No. 3,507,827, stabilizer combinations for decreasing early discoloration of polyvinyl chloride resins which contain (1) a dialkyl, dicycloalkyl or alkylcycloalkyl tin mercapto carboxylic acid ester, and (2) an alpha- or beta-mercapto acid having at least three carbon atoms, or an alpha- or beta-mercapto alcohol having at least two carbon atoms.

SUMMARY OF THE INVENTION

In accordance with this invention there are provided compositions for stabilizing halogen-containing organic polymers which comprise (1) a mono-organotin compound or mixture of mono-organotin compounds, (2) a mercaptan-containing organic compound or mixture of mercaptan-containing organic compounds, and, optionally, (3) a diorganotin compound or mixture of diorganotin compounds. This invention is also directed to polymer compositions comprising (1) a polymer normally susceptible to heat induced deterioration, (2) a mono-organotin compound or mixture of mono-organotin compounds, (3) a mercaptan-containing organic compound or mixture of mercaptan-containing organic compounds, and, optionally, (4) a diorganotin compound or mixture of diorganotin compounds. Additionally, this invention is directed to articles of manufacture, e.g. pipe, made from stabilized polymer compositions comprising (1) a polymer normally susceptible to heat induced deterioration, (2) a mono-organotin compound or mixture of mono-organotin compounds, (3) a mercaptan-containing organic compound or mixture of mercaptan-containing organic compounds, and, optionally, (4) a diorganotin compound or mixture of diorganotin compounds.

DETAILED DESCRIPTION

The stabilizer compositions of this invention have quite unexpectedly been found to impart stabilization against the deteriorative effects of heat to halogen-containing organic polymers which is superior to those stabilizer compositions previously known in the art.

The term halogen-containing organic polymers as used herein refers to halogen-containing vinyl and vinylidene polymers or resins in which the halogen is attached directly to the carbon atoms. Preferably, the polymer is a vinyl halide polymer, more particularly a vinyl chloride polymer. Usually, the vinyl chloride polymer is made from monomers consisting of vinyl chloride alone or a mixture of monomers comprising, preferably, at least about 70% by weight based on the total monomer weight of vinyl chloride.

The halogen-containing polymers which can be stabilized according to this invention include chlorinated polyethylene having 14 to 75%, e.g. 27%, chloride by weight, chlorinated natural and synthetic rubber, rubber hydrochloride, chlorinated polystyrene, chlorinated polyvinyl chloride, polyvinyl bromide, polyvinyl fluoride, copolymers of vinyl chloride with 1 to 90%, preferably 1 to 30%, of a copolymerizable ethylenically unsaturated material such as, for example, vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride (86:13:1), vinyl chloride-vinylidene chloride (95:5); vinyl chloride-diethyl fumarate (95:5), and vinyl chloride-2-ethylhexyl acrylate (80:20). In addition to the stabilizer compositions of this invention, there can also be incorporated into the halogen-containing organic polymer conventional additives such as plasticizers, pigments, fillers, dyes, ultraviolet light absorbing agents, densifying agents and the like.

The stabilizer compositions useful in the practice of this invention comprise (1) a mono-organotin compound or mixture of mono-organotin compounds, (2) a mercaptan-containing organic compound or mixture of mercaptan-containing organic compounds, and, optionally, (3) a diorganotin compound or mixture of diorganotin compounds. The mono-organotin compounds useful in this invention contain one or more tetravalent tin atoms which each have one direct tin to carbon bond and have structures selected from the following fomulas:

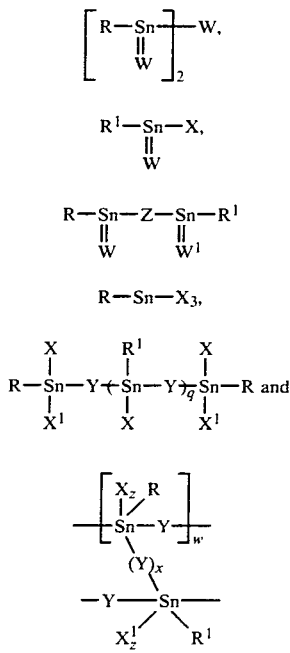 (I)

(II)

(IIa)

(III)

(IV)

(V)

wherein

X and $X^1$ are the same or different and are selected from $-SR^2$,

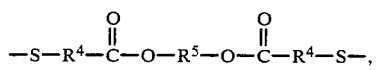

and $O-R^8$ with the proviso that in formula (V) when $z=1$ and in formulas (III) and (IV) at least one X or $X^1$ is $-SR^2$;

Y is

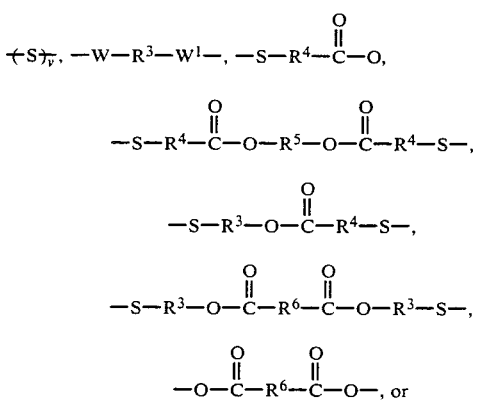

W and $W^1$ are the same or different and are oxygen or sulfur;

Z is

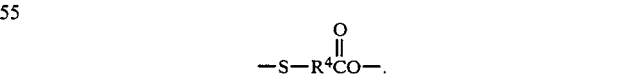

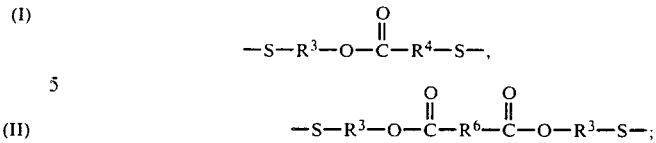

R and $R^1$ are the same or different and are selected from alkyl, aryl, alkenyl, aralkyl, alkaryl, cycloalkyl, cycloalkenyl,

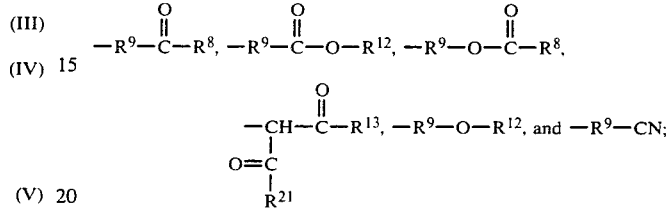

$R^2$ is alkyl, alkenyl, aryl, aralkyl, cycloalkyl, cycloalkenyl,

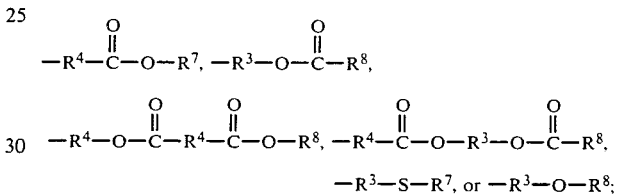

$-R^3-S-R^7$, or $-R^3-O-R^8$;

$R^3$ is alkylene of at least 2 carbon atoms, arylene, alkenylene of at least 2 carbon atoms, cycloalkylene, or cycloalkenylene;

$R^4$ is alkylene, arylene, alkenylene of at least 2 carbon atoms, cycloalkylene, or cycloalkenylene;

$R^5$ is $R^3$;

$R^6$ is nothing or $R^4$;

$R^7$ is $-H$ or $R^8$;

$R^8$ is alkyl, alkenyl, aryl, aralkyl, alkaryl, cycloalkyl, or cycloalkenyl;

$R^9$ is $C_1$ to $C_4$ alkylene;

$R^{12}$ is $-H$ or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy;

$q=0$ or an integer from 1 to 4 inclusive;

$v=$ an integer from 1 to 8 inclusive; and $w=0$, 1 or 2, $x=0$ or 1, $z=0$ or 1 with the proviso that when $x=0$ then $z=1$, when $x=1$ then $z=0$ and $w=1$, when $w=2$ then $x=0$ and $z=1$, and when $w=0$ then $x=0$, $z=1$ and Y is $-W-R^3-W^1-$ or

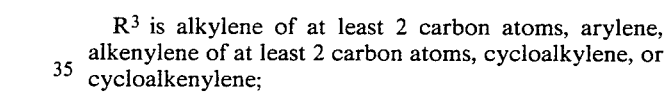

As used herein the term alkyl represents monovalent straight or branched chain hydrocarbon radicals containing, for example, 1 to 20 carbon atoms. The term aryl refers to monovalent $C_6-C_{10}$ aromatic rings such as benzene and naphthalene. The term alkenyl refers to monovalent straight or branched chain $C_2$ to $C_{20}$ hydrocarbon radicals containing at least one double bond. The term aralkyl represents a monovalent $C_1$ to $C_{20}$ hydrocarbon radical having attached thereto an aryl radical. The term alkaryl refers to monovalent aryl radicals having attached thereto at least one $C_1-C_{20}$ alkyl group. The term cycloalkyl represents monovalent $C_3-C_8$ saturated cycloaliphatic radicals, and the term cycloalkenyl represents $C_5-C_8$ cycloaliphatic radicals containing at least one double bond.

The preferred mono-organotin compounds useful in this invention are those compounds according to formula (I) where R is methyl, butyl or octyl and W is sulfur; those compounds according to formula (II) where $R^1$ is methyl or butyl, W is sulfur, X is $-SR^2$ where $R^2$ is

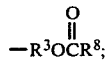

those compounds according to formula (IIa) where R and $R^1$ are methyl, butyl, octyl or

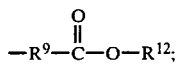

W and $W^1$ are oxygen or sulfur; and Z is

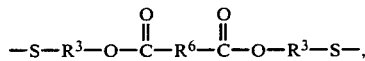

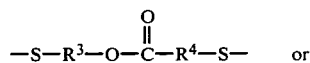  or

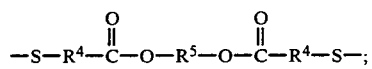

those compounds according to formula (III) where R is methyl or butyl, X is $-SR^2$ where $R^2$ is

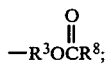

those compounds according to formula (IV) where R is methyl, X is $-SR^2$ where $R^2$ is

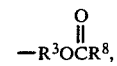

$R^1$ is methyl, $X^1$ is $-SR^2$ where $R^2$ is

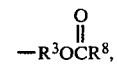

Y is $-S-$, and q=0; and those compounds according to formula (V) where R is methyl, X is $-SR^2$ where $R^2$ is

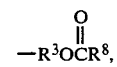

$R^1$ is methyl, $X^1$ is $-SR^2$ wherein $R^2$ is

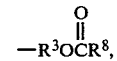

Y is $-S-$, w=1, x=0, and z=1.

Examples of mono-organotin compounds which are useful in this invention include, but are not limited to, those illustrated in Tables I–IV below. Thus, representative of the mono-organotin compounds described by formulas (I) and (II) are those illustrated in Table I below.

Examples of the mono-organotin compounds described by formula (IIa) are those illustrated in Table Ia below.

Examples of the mono-organotin compounds represented by formula (III) are illustrated in Table II below.

The mono-organotin compounds illustrated in Table III below are representative of compounds described by formula (IV).

The mono-organotin compound illustrated in Table IV below is representative of compounds described by formula (V).

TABLE I $$\left[ R-\underset{\underset{W}{\|}}{Sn} \right]_2 W, \quad (I)$$

$$R^1-\underset{\underset{W}{\|}}{Sn}-X, \quad (II)$$

| Mono-organotin Compound No. | R | $R^1$ | W | X |
|---|---|---|---|---|
| 1 | $-C_4H_9$ | — | S | — |
| 2 | $-C_8H_{17}$ | — | O | — |
| 3 | — | $-CH_3$ | S | $-SCH_2CH_2O\overset{O}{\underset{\|}{C}}C_{17}H_{33}$ |
| 4 | — | $-CH_3$ | S | $-SCH_2\overset{O}{\underset{\|}{C}}OC_8H_{17}$ |
| 5 | — | $-CH_2CH_2\overset{O}{\underset{\|}{C}}OC_4H_9$ | S | $-SCH_2CH_2\overset{O}{\underset{\|}{C}}OC_{18}H_{37}$ |

TABLE Ia $$R-\underset{\underset{W}{\|}}{Sn}-Z-\underset{\underset{W^1}{\|}}{Sn}-R^1 \quad (IIa)$$

| Mono-organotin Compound No. | R and $R^1$ | W | $W^1$ | Z |
|---|---|---|---|---|
| 5a | $-CH_3$ | S | S | $-SCH_2CH_2O\overset{O}{\overset{\|}{C}}(CH_2)_4\overset{O}{\overset{\|}{C}}OCH_2CH_2-S-$ |
| 5b | $-C_4H_9$ | S | S | $-SCH_2CH_2O\overset{O}{\overset{\|}{C}}CH_2CH_2S-$ |
| 5c | $-C_8H_{17}$ | O | S | $-SCH_2\overset{O}{\overset{\|}{C}}OCH_2CH_2O\overset{O}{\overset{\|}{C}}CH_2S-$ |
| 5d | $-CH_2CH_2\overset{O}{\overset{\|}{C}}OC_4H_9$ | S | S | $-SCH_2CH_2O\overset{O}{\overset{\|}{C}}CH=CH\overset{O}{\overset{\|}{C}}OCH_2CH_2S-$ |
| 5e | $-CH_3$ | S | S | $-SCH_2\underset{C_9H_{19}}{CH}-O\overset{O}{\overset{\|}{C}}CH=CH\overset{O}{\overset{\|}{C}}OCH\underset{C_9H_{19}}{CH_2}S-$ |
| 5f | $-C_4H_9$ | S | S | $-S\underset{OH}{CH}\overset{O}{\overset{\|}{C}}O(CH_2)_2S-$ |
| 5g | $-C_4H_9$ | O | O | $-S\underset{\underset{O}{\overset{\|}{O}}CCH=CH\overset{O}{\overset{\|}{C}}OCH_3}{CH}\overset{O}{\overset{\|}{C}}OCH_2CH_2S-$ |
| 5h | $-CH_3$ | S | S | $-SCH_2\overset{O}{\overset{\|}{C}}OCH_2\underset{(CH_2OH)_2}{CCH_2}O\overset{O}{\overset{\|}{C}}CH_2S-$ |
| 5i | $-CH_3$ | S | S | $-SCH_2\overset{O}{\overset{\|}{C}}OCH_2\underset{(CH_2O\overset{O}{\overset{\|}{C}}CH_3)_2}{CCH_2}O\overset{O}{\overset{\|}{C}}CH_2S-$ |

TABLE II $$R-Sn-X_3, \quad (III)$$

| Mono-organotin Compound No. | R | X |
|---|---|---|
| 6 | $-CH_3$ | $-SCH_2\overset{O}{\overset{\|}{C}}OC_8H_{17}$ |
| 7 | $-C_4H_9$ | $-SCH_2CH_2O\overset{O}{\overset{\|}{C}}C_7H_{15}$ |

TABLE III

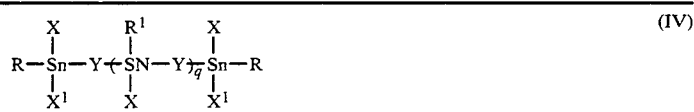

$$(IV)$$

| Mono-organotin Compound No. | R and $R^1$ | X | $X^1$ | Y | q |
|---|---|---|---|---|---|
| 8 | $-CH_3$ | $-SCH_2CH_2O\overset{O}{\overset{\|}{C}}C_{11}H_{23}$ | Same as X | $-S-$ | 0 |

TABLE III-continued

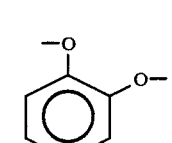

| Mono-organotin Compound No. | R and R¹ | X | X¹ | Y | q |
|---|---|---|---|---|---|
| 9 | —CH₂CH₂$\overset{O}{\overset{\|}{C}}$OC₄H₉ | —S CH₂CH₂$\overset{O}{\overset{\|}{C}}$OC₈H₁₇ | Same as X | —S—S— | 0 |
| 10 | —CH₃ | —SCH₂CH₂O$\overset{O}{\overset{\|}{C}}$C₁₇H₃₃ | Same as X | —SCH₂$\overset{O}{\overset{\|}{C}}$OC₄H₈O$\overset{O}{\overset{\|}{C}}$CH₂S— | 1 |
| 11 | —CH₃ | —SCH₂CH₂O$\overset{O}{\overset{\|}{C}}$CH=CH$\overset{O}{\overset{\|}{C}}$OCH₃ | Same as X | —S— | 0 |
| 12 | —C₄H₉ | —SCH₂CH₂O$\overset{O}{\overset{\|}{C}}$C₈H₁₇ | Same as X | —S—CH₂$\overset{O}{\overset{\|}{C}}$O— | 0 |
| 13 | —CH₃ | —SCH₂CH₂O$\overset{O}{\overset{\|}{C}}$C₁₁H₂₃ | Same as X | —S— | 0 |
| 14 | —C₄H₉ | —SCH₂CH₂O$\overset{O}{\overset{\|}{C}}$C₇H₁₅ | Same as X | 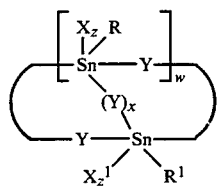 | 0 |

TABLE IV

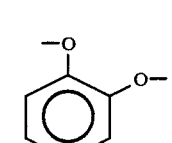  (V)

| Mono-organotin Compound No. | R and R¹ | X and X¹ | Y | w | x | z |
|---|---|---|---|---|---|---|
| 15 | —CH₃ | —SCH₂CH₂O$\overset{O}{\overset{\|}{C}}$C₁₇H₃₃ | —S— | 1 | 0 | 1 |

As used in Tables I–IV above, and throughout this specification, the radicals —C₄H₉, —C₈H₁₇, —C₁₂H₂₅, —C₉H₁₉ and —C₁₀H₂₁ represent n-butyl, n-octyl, n-dodecyl, n-nonyl and n-decyl respectively.

The carboxyl radicals

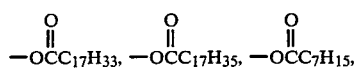

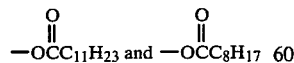

are derived from oleic acid, stearic acid, n-octanoic acid, lauric acid, and pelargonic acid respectively. Likewise, the radicals —OC₁₃H₂₇, —OC₁₈H₃₇, and —OC₈H₁₇ are derived from tridecanol, stearyl alcohol and iso-octanol respectively.

The mercaptan-containing organic compounds useful in this invention include hydrocarbyl mercaptans, mercapto esters, mercapto alcohols, and mercapto acids. These mercaptan-containing organic compounds have structures illustrated by the following formulas:

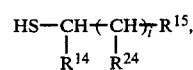 (VI)

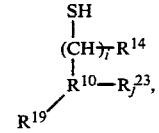 (VII)

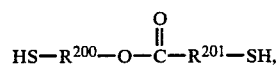 (VIIa)

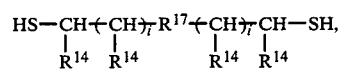 (VIII)

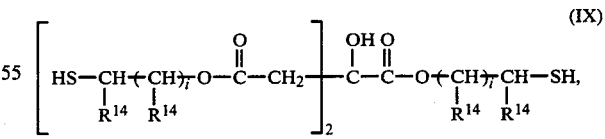 (IX)

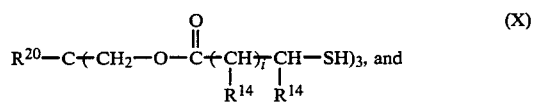 (X)

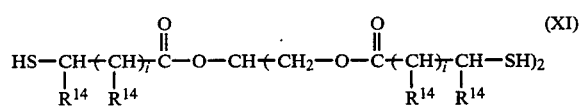 (XI)

where $R^{10}$ is cycloalkyl, cycloalkenyl or phenyl;
$R^{14}$ is —H, aryl, or $C_1$ to $C_{18}$ alkyl;
$R^{15}$ and $R^{24}$ are the same or different and are

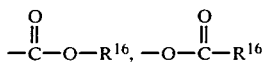

—OH, —SH, aryl, $C_1$ to $C_{18}$ alkyl, or —H;
$R^{16}$ is —H or $R^8$;
$R^{17}$ is

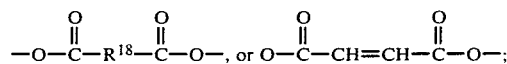

$R^{18}$ is arylene, $C_1$ to $C_8$ alkylene, or

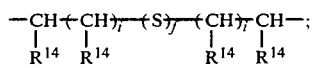

$R^{19}$ is —H or a divalent group which may contain halogen, hydroxy, mercapto or alkyl substituents and which when $R^{10}$ is phenyl combines with the phenyl to form a naphthalene ring;
$R^{20}$ is —$CH_3$, —$CH_2CH_3$, or

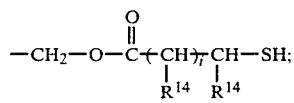

$R^{23}$ is

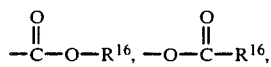

—SH, aryl, $C_1$ to $C_{18}$ alkyl, —OH or —H with the proviso that in formula (VII) when $R^{10}$ is phenyl, $R^{23}$ is —OH and i=0, then the —OH and —SH groups are on non-adjacent carbon atoms;
$R^{200}$ and $R^{201}$ are the same or different and are alkylene, alkenylene, arylene, cycloalkylene or cycloalkenylene; or alkylene, alkenylene, arylene, cycloalkylene or cycloalkenylene each substituted with one or two —R, —O—$R^7$, —$R^9$—O—$R^7$,

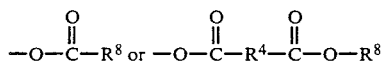

groups; R, $R^7$, $R^8$, $R^4$ and $R^9$ are as previously defined;
i=0 or an integer from 1 to 6 inclusive;
j=0, 1, 2 or 3; and
f=1 or 2;
with the proviso that (1) when a mono-organotin compound according to formula (I) is employed, then the mercaptan-containing organic compounds are selected from compounds having formula VI where $R^{15}$ and $R^{24}$ are the same or different and are

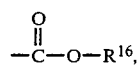

—OH, —SH, aryl, $C_1$ to $C_{18}$ alkyl or —H; and $R^{14}$ and i are as previously defined; compounds having formula VII where $R^{23}$ is

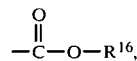

—SH, aryl, $C_1$ to $C_{18}$ alkyl, —OH, or —H; and $R^{14}$, i, $R^{10}$, $R^{19}$ and j are as previously defined; and compounds having formulas VIII, IX, X and/or XI; and (2) when a mono-organotin compound according to formulas II, III, IV or V wherein X is —$SR^2$ and $R^2$ is alkyl, alkenyl, aryl, aralkyl, cycloalkyl or cycloalkenyl is employed, then the mercaptan-containing organic compounds are selected from compounds having formula VI where when either $R^{15}$ or $R^{24}$ is —OH, then the —SH and —OH groups are separated by at least 3 carbon atoms; compounds having formula VII where when $R^{23}$ is —OH, then the —SH and —OH groups are separated by at least 3 carbon atoms; and/or compounds having formulas VIIa, VIII, IX, X and/or XI.

The mercaptan-containing organic compounds useful in this invention are well-known compounds (see, for example, U.S. Pat. Nos. 3,503,924 and 3,507,827).

The preferred mercaptan-containing organic compounds useful in this invention are those compounds according to formula (VI) where $R^{14}$ is —H, $R^{24}$ is —H, $R^{15}$ is

and i=1; those compounds according to formula (VII) where $R^{10}$ is phenyl, $R^{14}$ is —H, $R^{23}$ is —H, $R^{19}$ is —H, i=1 and j=1; those compounds according to formula (VIIa) where $R^{200}$ is —$CH_2CH_2$— or

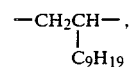

and $R^{201}$ is —$CH_2$— or

those compounds according to formula (VIII) where $R^{14}$ is —H, $R^{17}$ is

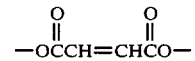

and i=1; those compounds according to formula (IX) where $R^{14}$ is —H and i=1; those compounds according to formula (X) where $R^{20}$ is —$C_2H_5$ or

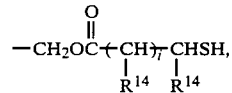

$R^{14}$ is —H and i=1; and those compounds according to formula (XI) where $R^{14}$ is —H and i=1.

Examples of the mercaptan-containing organic compounds described by formula (VI) include, but are not limited to, the following compounds:

$HSC_{12}H_{25}$

-continued

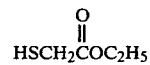
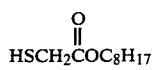
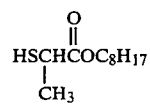
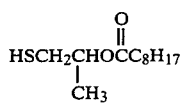
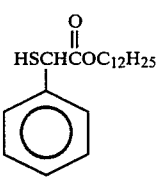
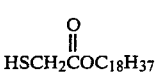
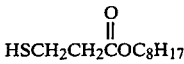
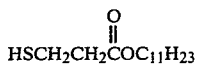
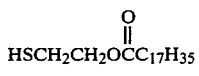
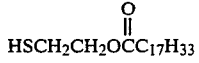
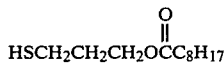
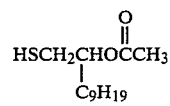
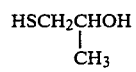
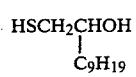

-continued

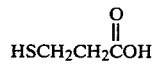
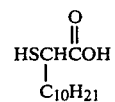

Examples of the mercaptan-containing organic compounds described by formula (VII) include, but are not limited to, the following compounds:

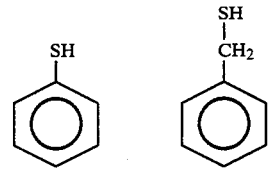

The mercaptan-containing organic compounds represented by formula (VIIa) are exemplified by, but are not limited to, the following:

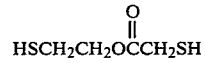
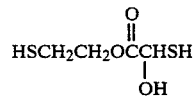
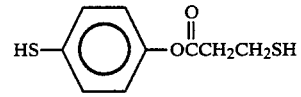
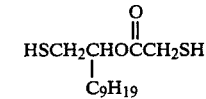
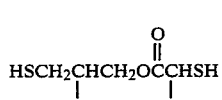
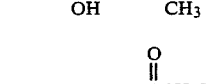

Examples of mercaptan-containing organic compounds represented by formula (VIII) include, but are not limited to, the following compounds:

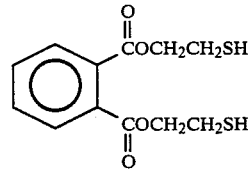
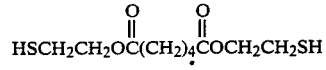

-continued

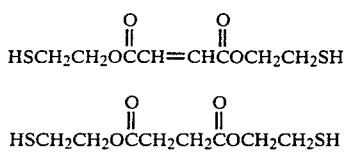

An example of the mercaptan-containing organic compounds described by formula (IX) includes, but is not limited to, the following:

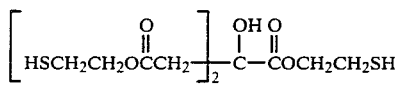

The mercaptan-containing organic compounds represented by formula (X) are exemplified by, but are not limited to, the following:

The mercaptan-containing organic compounds represented by formula (XI) are exemplified by, but are not limited to, the following:

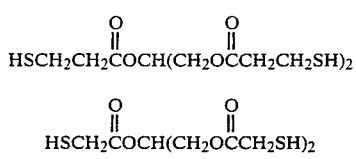

The diorganotin compounds useful in the practice of this invention contain one or more tetravalent tin atoms, at least one of which has direct bonds to two carbon atoms and have structures selected from the following formulas:

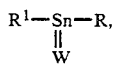 (XII)

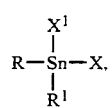 (XIII)

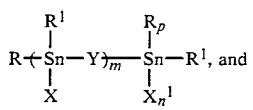 (XIV)

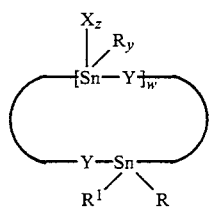 (XV)

wherein
R, $R^1$, W, X, $X^1$, Y, w and z are as previously defined;
n=0, 1 or 2, p=0, 1 or 2 with the proviso that n+p=2, and m=1 to 5;
y=1 or 2, y+z=2 with the proviso that when w=0 then Y is —W—$R^3$—$W^1$, or

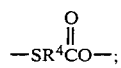

and in formula (XV) when z=1 and in formulas (XIII) and (XIV) at least one X or $X^1$ is —$SR^2$.

The mono-organotin compounds and diorganotin compounds useful in this invention may be prepared by methods well-known in the art. See, for example, U.S. Pat. Nos. 3,565,930, 3,869,487, 3,979,359, 4,118,371, 4,134,878 and 4,183,846.

The preferred diorganotin compounds used in the practice of this invention are those compounds according to formula (XII) where R is methyl or butyl, $R^1$ is methyl or butyl and W is sulfur; those compounds according to formula (XIII) where R is methyl or butyl, $R^1$ is methyl or butyl, X is —$SR^2$ where $R^2$ is

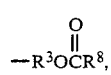

and $X^1$ is —$SR^2$ where $R^2$ is

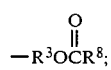

those compounds according to formula (XIV) where R is methyl or butyl, $R^1$ is methyl or butyl, Y is —S—, X is —$SR^2$ where $R^2$ is

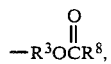

$X^1$ is —$SR^2$ where $R^2$ is

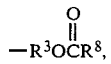

m=1, n=2 and p=0; and those compounds according to formula (XV) where R is methyl or butyl, $R^1$ is methyl or butyl, X is —$SR^2$ where $R^2$ is

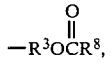

Y is —S—, w=1, y=1 and z=1.

Examples of diorganotin compounds according to formula (XII) include, but are not limited to, the compounds illustrated in Table V below.

TABLE V

| | $R^1$—Sn—R, ‖ W | | (XII) |
|---|---|---|---|
| Diorganotin Compound | R | $R^1$ | W |
| A | —$C_4H_9$ | —$C_4H_9$ | S |
| B | —$C_8H_{17}$ | —$C_8H_{17}$ | O |

Examples of diorganotin compounds according to formula (XIII) include, but are not limited to, the compounds in Table VI below.

TABLE VI $$R-\underset{\underset{R^1}{|}}{\overset{\overset{X^1}{|}}{Sn}}-X, \quad (XIII)$$

| Diorganotin Compound | R | $R^1$ | X and $X^1$ |
|---|---|---|---|
| C | $-CH_2CH_2\overset{O}{\overset{\|\|}{C}}C_4H_9$ | Same as R | $-SCH_2CH_2O\overset{O}{\overset{\|\|}{C}}CH_3$ |
| D | $-CH_3$ | Same as R | $-SCH_2CH_2O\overset{O}{\overset{\|\|}{C}}C_{17}H_{35}$ |

Examples of diorganotin compounds according to formula (XIV) include, but are not limited to, the compounds in Table VII below.

TABLE VII $$R+Sn-Y)_{\overline{m}}Sn-R^1 \quad (XIV)$$

(with $R^1$, $R_p$ above Sn atoms and X, $X_n^1$ below)

| Diorganotin Compound | R and $R^1$ | X | $X^1$ | Y | n | p | m |
|---|---|---|---|---|---|---|---|
| E | $-CH_3$ | $-SCH_2\overset{O}{\overset{\|\|}{C}}C_{13}H_{27}$ | Same as X | $-S-$ | 1 | 1 | 1 |
| F | $-C_4H_9$ | $-SCH_2CH_2O\overset{O}{\overset{\|\|}{C}}C_8H_{17}$ | " | $-S-$ | 1 | 1 | 1 |

Examples of diorganotin compounds according to formula (XV) include, but are not limited to, the compounds in Table VIII below.

TABLE VIII (XV) — cyclic structure with $[Sn-Y]_w$ containing $X_z$, $R_y$ and closing $-Y-Sn-$ with $R^1$, R

| Diorganotin Compound | R | $R^1$ | X | Y | w | y | z |
|---|---|---|---|---|---|---|---|
| G | $-C_4H_9$ | $-C_4H_9$ | $-SCH_2CH_2\overset{O}{\overset{\|\|}{C}}C_8H_{17}$ | $-S-$ | 1 | 1 | 1 |

It should be noted that, in an effort to simplify the foregoing formulas I—XV and render them as clear and concise as possible, some letters are used more than once in the same formula and/or in more than one formula. Thus, for example, $R^1$ appears twice in formula XIV and also in formulas II, IIa, IV, V, XII, XIII and XV. It is intended that, in those instances where the same letter is used either more than once in the same formula or in more than one formula, that letter represents at each independent occurence any group contained in the set of groups encompassed by its definition, or any and all subsets thereof. It is further intended that any modification or limitation in the definition of a particular letter at one occurence does not necessarily affect its definition at any other occurence. For example, should the definition of X in formula II be limited from $-SR^2$,

or $-OR^8$ to $-SR^2$, then X in each of formulas III, IV, V, XIII, XIV and XV may still represent at each independent occurence the set of groups consisting of $-SR^2$,

and $-OR^8$, or any and all subsets thereof such as, for example, $-SR^2$ and

and $-OR^8$.

In one embodiment of this invention, the stabilizer compositions comprise: (A) a mono-organotin compound or mixture of mono-organotin compounds selected from compounds having formulas I, II, IIa, III, IV and/or V; (B) a mercaptan-containing organic compound or mixture of mercaptan-containing compounds selected from compounds having formula VI, VII, VIIa, VIII, IX, X and/or XI; and optionally, (C) a diorganotin compound or mixture of diorganotin compounds selected from compounds having formulas XII, XIII, XIV and/or XV. Thus, the stabilizer compositions of this embodiment comprise:

A. a mono-organotin compound or mixture of mono-organotin compounds selected from compounds having the formulas:

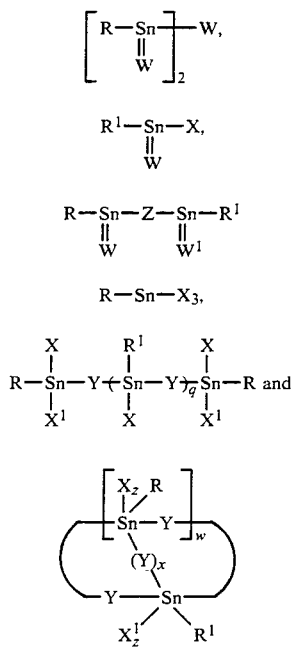

$$\left[ \begin{array}{c} R-Sn \\ \parallel \\ W \end{array} \right]_2 W, \quad (I)$$

$$R^1-Sn-X, \quad (II)$$
$$\phantom{R^1-}\parallel$$
$$\phantom{R^1-S}W$$

$$R-Sn-Z-Sn-R^1 \quad (IIa)$$
$$\phantom{R-}\parallel \phantom{-Z-}\parallel$$
$$\phantom{R-S}W \phantom{-Z-Sn}W^1$$

$$R-Sn-X_3, \quad (III)$$

$$\begin{array}{ccc} X & R^1 & X \\ | & | & | \\ R-Sn-Y+Sn-Y\!\!\!\!/_q Sn-R \text{ and} \\ | & | & | \\ X^1 & X & X^1 \end{array} \quad (IV)$$

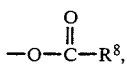

(V)

wherein
X and $X^1$ are the same or different and are selected from $-SR^2$, $$-O-\overset{O}{\underset{\parallel}{C}}-R^8,$$

and $O-R^8$ with the proviso that in formula (V) when $z=1$ and in formulas (III) and (IV) at least one X or $X^1$ is $-SR^2$;

Y is

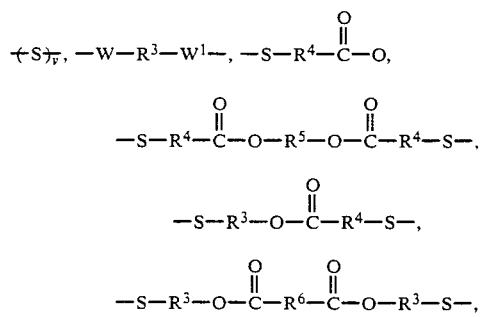

$$+S\!\!\!\!/_v, \quad -W-R^3-W^1-, \quad -S-R^4-\overset{O}{\underset{\parallel}{C}}-O,$$

$$-S-R^4-\overset{O}{\underset{\parallel}{C}}-O-R^5-O-\overset{O}{\underset{\parallel}{C}}-R^4-S-,$$

$$-S-R^3-O-\overset{O}{\underset{\parallel}{C}}-R^4-S-,$$

$$-S-R^3-O-\overset{O}{\underset{\parallel}{C}}-R^6-\overset{O}{\underset{\parallel}{C}}-O-R^3-S-,$$

$$-O-\overset{O}{\underset{\parallel}{C}}-R^6-\overset{O}{\underset{\parallel}{C}}-O-, \text{ or}$$

$$-O-\overset{O}{\underset{\parallel}{C}}-R^6-\overset{O}{\underset{\parallel}{C}}-O-R^5-O-\overset{O}{\underset{\parallel}{C}}-R^6-\overset{O}{\underset{\parallel}{C}}-O;$$

W and $W^1$ are the same or different and are oxygen or sulfur;
Z is $$-S-R^4-\overset{O}{\underset{\parallel}{C}}-O-R^5-O-\overset{O}{\underset{\parallel}{C}}-R^4-S-,$$

$$-S-R^3-O-\overset{O}{\underset{\parallel}{C}}-R^4-S-,$$

$$-S-R^3-O-\overset{O}{\underset{\parallel}{C}}-R^6-\overset{O}{\underset{\parallel}{C}}-O-R^3-S-;$$

R and $R^1$ are the same or different and are selected from alkyl, aryl, alkenyl, aralkyl, alkaryl, cycloalkyl, cycloalkenyl, $$-R^9-\overset{O}{\underset{\parallel}{C}}-R^8, \quad -R^9-\overset{O}{\underset{\parallel}{C}}-O-R^{12}, \quad -R^9-O-\overset{O}{\underset{\parallel}{C}}-R^8,$$

$$\begin{array}{c} -CH-\overset{O}{\underset{\parallel}{C}}-R^{13}, \quad -R^9-O-R^{12}, \text{ and } -R^9-CN; \\ | \\ O=C \\ | \\ R^{21} \end{array}$$

$R^2$ is alkyl, alkenyl, aryl, aralkyl, cycloalkyl, cycloalkenyl, $$-R^4-\overset{O}{\underset{\parallel}{C}}-O-R^7, \quad -R^3-O-\overset{O}{\underset{\parallel}{C}}-R^8,$$

$$-R^4-O-\overset{O}{\underset{\parallel}{C}}-R^4-\overset{O}{\underset{\parallel}{C}}-O-R^8, \quad -R^4-\overset{O}{\underset{\parallel}{C}}-O-R^3-O-\overset{O}{\underset{\parallel}{C}}-R^8,$$

$$-R^3-S-R^7, \text{ or } -R^3-O-R^8;$$

$R^3$ is alkylene of at least 2 carbon atoms, arylene, alkenylene of at least 2 carbon atoms, cycloalkylene, or cycloalkenylene;
$R^4$ is alkylene, arylene, alkenylene of at least 2 carbon atoms, cycloalkylene, or cycloalkenylene;
$R^5$ is $R^3$;
$R^6$ is nothing or $R^4$;
$R^7$ is $-H$ or $R^8$;
$R^8$ is alkyl, alkenyl, aryl, aralkyl, alkaryl, cycloalkyl, or cycloalkenyl;
$R^9$ is $C_1$ to $C_4$ alkylene;
$R^{12}$ is $-H$ or a monovalent $C_1$ to $C_{20}$ hydrocarbon radical;
$R^{13}$ and $R^{21}$ are the same or different and are each $C_1$ to $C_{20}$ alkyl or $C_1$ to $C_{20}$ alkoxy;
q=0 or an integer from 1 to 4 inclusive;
v=an integer from 1 to 8 inclusive; and
w=0, 1 or 2, x=0 or 1, z=0 or 1 with the proviso that when x=0 then z=1, when x=1 then z=0 and w=1, when w=2 then x=0 and z=1, and when w=0 then x=0, z=1 and Y is $-W-R^3-W^1$ or $$-S-R^4\overset{O}{\underset{\parallel}{C}}O-.$$

B. a mercaptan-containing organic compound or mixture of mercaptan-containing organic compounds selected from compounds having the formulas:

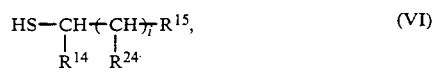

$$HS-CH+CH\!\!\!\!/_T R^{15}, \quad (VI)$$
$$\phantom{HS-}| \phantom{CH+CH}|$$
$$\phantom{HS-}R^{14} \phantom{+CH}R^{24}$$

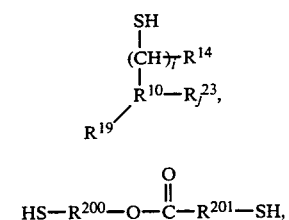
(VII)

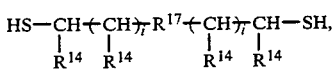
(VIIa)

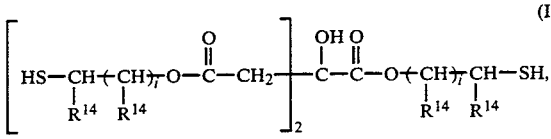
(VIII)

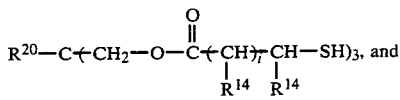
(IX)

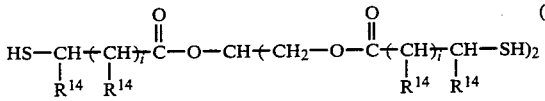
(X)

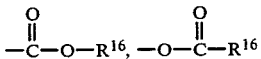
(XI)

where
$R^{10}$ is cycloalkyl, cycloalkenyl or phenyl;
$R^{14}$ is —H, aryl, or $C_1$ to $C_{18}$ alkyl;
$R^{15}$ and $R^{24}$ are the same or different and are

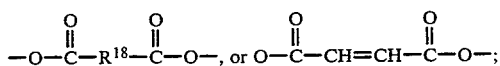

—OH, —SH, aryl, $C_1$ to $C_{18}$ alkyl, or —H;
$R^{16}$ is —H or $R^8$;
$R^{17}$ is

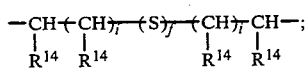

$R^{18}$ is arylene, $C_1$ to $C_8$ alkylene, or

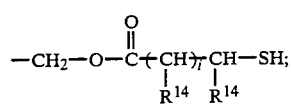

$R^{19}$ is —H or a divalent group which may contain halogen, hydroxy, mercapto or alkyl substituents and which when $R^{10}$ is phenyl combines with the phenyl to form a naphthalene ring;
$R^{20}$ is —$CH_3$, —$CH_2CH_3$, or

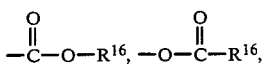

$R^{23}$ is

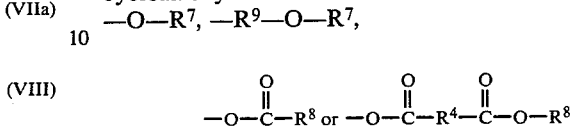

—SH, aryl, $C_1$ to $C_{18}$ alkyl, —OH or —H with the proviso that in formula (VII) when $R^{10}$ is phenyl, $R^{23}$ is —OH and i=0, then the —OH and —SH groups are on non-adjacent carbon atoms;
$R^{200}$ and $R^{201}$ are the same or different and are alkylene, alkenylene, arylene, cycloalkylene or cycloalkenylene; or alkylene, alkenylene, arylene, cycloalkylene or cycloalkenylene each substituted with one or two —R, —O—$R^7$, —$R^9$—O—$R^7$,

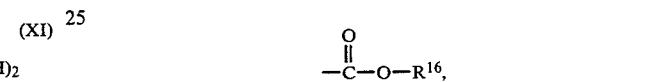

groups; R, $R^7$, $R^8$, $R^4$ and $R^9$ are as previously defined;
i=0 or an integer from 1 to 6 inclusive;
j=0, 1, 2 or 3; and
f=1 or 2;
with the proviso that (1) when a mono-organotin compound according to formula (I) is employed, then the mercaptan-containing organic compounds are selected from compounds having formula VI where $R^{15}$ and $R^{24}$ are the same or different and are

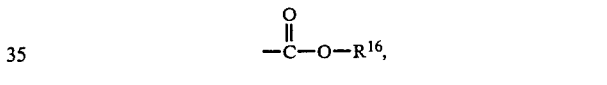

—OH, —SH, aryl, $C_1$ to $C_{18}$ alkyl or —H; and $R^{14}$ and i are as previously defined; compounds having formula VII where $R^{23}$ is $$-\overset{O}{\underset{\|}{C}}-O-R^{16},$$

—SH, aryl, $C_1$ to $C_{18}$ alkyl, —OH, or —H; and $R^{14}$, i, $R^{10}$, $R^{19}$ and j are as previously defined; and compounds having formulas VIII, IX, X and/or XI; and (2) when a mono-organotin compound according to formulas II, III, IV or V wherein X is —$SR^2$ and $R^2$ is alkyl, alkenyl, aryl, aralkyl, cycloalkyl or cycloalkenyl is employed, then the mercaptan-containing organic compounds are selected from compounds having formula VI where when either $R^{15}$ or $R^{24}$ is —OH, then the —SH and —OH groups are separated by at least 3 carbon atoms; compounds having formula VII where when $R^{23}$ is —OH, then the —SH and —OH groups are separated by at least 3 carbon atoms; and/or compounds having formulas VIIa, VIII, IX, X and/or XI; and, optionally, C. a diorganotin compound or mixture of diorganotin compounds selected from compounds having the formulas:

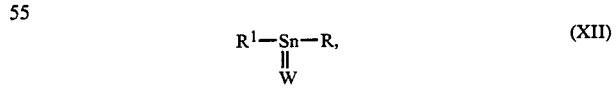
(XII)

(XIII)

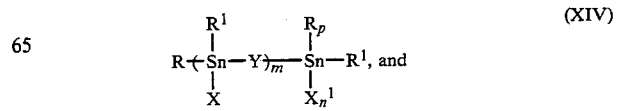
(XIV)

-continued

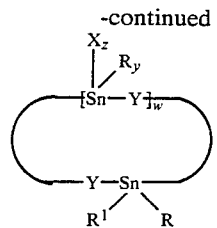

wherein
R, R¹, W, X, X¹, Y, w and z are as previously defined;
n=0, 1 or 2, p=0, 1 or 2 with the proviso that n+p=2, and m=1 to 5;
y=1 or 2, y+z=2 with the proviso that when w=0 then Y is —W—R³—W¹—, or

and in formula (XV) when z=1 and in formulas (XIII) and (XIV) at least one X or X¹ is —SR².

In another embodiment of this invention, the stabilizer compositions comprise: (A) a mono-organotin compound or mixture of mono-organotin compounds selected from compounds having formulas II, III, IV and/or V wherein at least one X or X¹ is —SR² and R² is alkyl, alkenyl, aryl, aralkyl, cycloalkyl or cycloalkenyl, (B) a mercaptan-containing organic compound or mixture of mercaptan-containing organic compounds selected from compounds having formula VI where when either R¹⁵ or R²⁴ is —OH, then the —SH and —OH groups are separated by at least 3 carbon atoms; compounds having formula VII where when R²³ is —OH, then the —SH and —OH groups are separated by at least 3 carbon atoms; and/or compounds having formulas VIII, IX, X and/or XI; and, optionally, (C) a diorganotin compound or mixture of diorganotin compounds selected from compounds having formulas XII, XIII, XIV and/or XV. Thus, the stabilizer compositions of this embodiment comprise:

A. a mono-organotin compound or mixture of mono-organotin compounds selected from compounds having the formulas:

$$R^1-\underset{\underset{W}{\parallel}}{Sn}-X, \quad (II)$$

$$R-Sn-X_3, \quad (III)$$

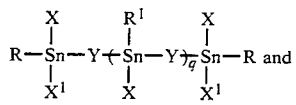

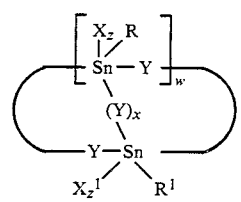

wherein
X and X¹ are the same or different and are selected from —SR², $$-O-\overset{O}{\underset{\parallel}{C}}-R^8,$$

and O—R⁸ with the proviso that in formula (V) when z=1 and in formulas II, III, IV and V at least one X or X¹ is —SR²;

Y is

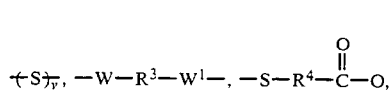

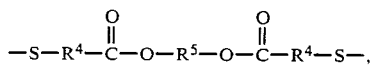

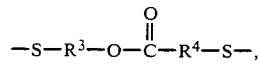

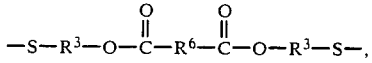

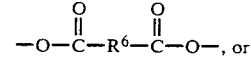

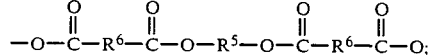

W and W¹ are the same or different and are oxygen or sulfur;

R and R¹ are the same or different and are selected from alkyl, aryl, alkenyl, aralkyl, alkaryl, cycloalkyl, cycloalkenyl,

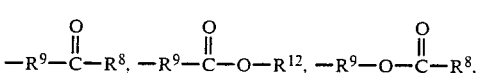

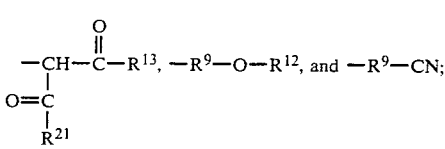

R² is alkyl, alkenyl, aryl, aralkyl, cycloalkyl or cycloalkenyl;

R³ is alkylene of at least 2 carbon atoms, arylene, alkenylene of at least 2 carbon atoms, cycloalkylene, or cycloalkenylene;

R⁴ is alkylene, arylene, alkenylene of at least 2 carbon atoms, cycloalkylene, or cycloalkenylene;

R⁵ is R³;

R⁶ is nothing or R⁴;

R⁷ is —H or R⁸;

R⁸ is alkyl, alkenyl, aryl, aralkyl, alkaryl, cycloalkyl, or cycloalkenyl;

R⁹ is C₁ to C₄ alkylene;

R¹² is —H or a monovalent C₁ to C₂₀ hydrocarbon radical;

R¹³ and R²¹ are the same or different and are each C₁ to C₂₀ alkyl or C₁ to C₂₀ alkoxy;

q=0 or an integer from 1 to 4 inclusive;

v=an integer from 1 to 8 inclusive; and w=0, 1 or 2, x=0 or 1, z=0 or 1 with the proviso that when x=0 then z=1, when x=1 then z=0 and w=1, when w=2 then x=0 and z=1, and when w=0 then x=0, z=1 and Y is —W—R³—W¹— or

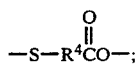

and,

B. a mercaptan-containing organic compound or mixture of mercaptan-containing organic compounds selected from compounds having the formulas:

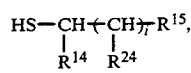

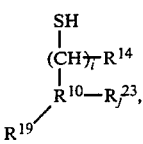

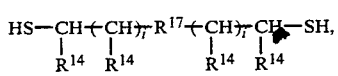

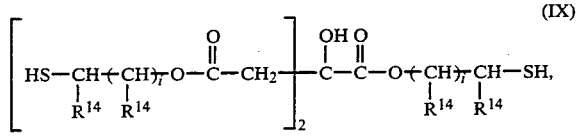

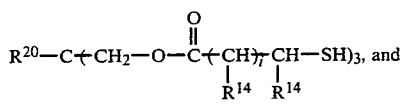

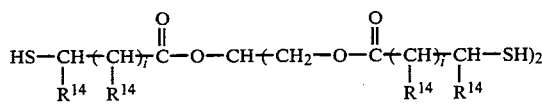

where
- $R^{10}$ is cycloalkyl, cycloalkenyl or phenyl;
- $R^{14}$ is —H, aryl, or $C_1$ to $C_{18}$ alkyl;
- $R^{15}$ and $R^{24}$ are the same or different and are

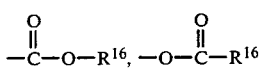

—OH, —SH, aryl, $C_1$ to $C_{18}$ alkyl, or —H;
- $R^{16}$ is —H or $R^8$;
- $R^{17}$ is

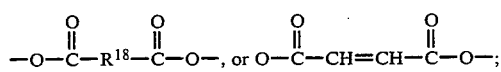

- $R^{18}$ is arylene, $C_1$ to $C_8$ alkylene, or

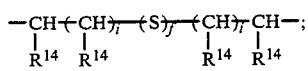

- $R^{19}$ is —H or a divalent group which may contain halogen, hydroxy, mercapto or alkyl substituents and which when $R^{10}$ is phenyl combines with the phenyl to form a naphthalene ring;
- $R^{20}$ is —CH$_3$, —CH$_2$CH$_3$, or

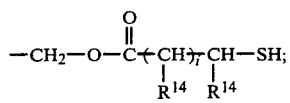

$R^{23}$ is

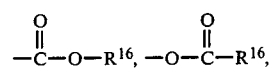

—SH, aryl, $C_1$ to $C_{18}$ alkyl, —OH or —H with the proviso that in formula (VII) when $R^{10}$ is phenyl, $R^{23}$ is —OH and i=0, then the —OH and —SH groups are on non-adjacent carbon atoms;

i=0 or an integer from 1 to 6 inclusive;
j=0, 1, 2 or 3; and
f=1 or 2;

with the proviso that (1) in formula VI when $R^{15}$ or $R^{24}$ is —OH, then the —SH and —OH groups are separated by at least 3 carbon atoms, and (2) in formula VII when $R^{23}$ is —OH, then the —SH and —OH groups are separated by at least 3 carbon atoms; and, optionally, C. a diorganotin compound or mixture of diorganotin compounds selected from compounds having the formulas:

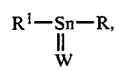

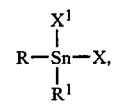

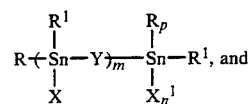

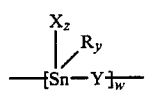

wherein
R, $R^1$, W, X, $X^1$, Y, w and z are as previously defined;
n=0, 1 or 2, p=0, 1 or 2 with the proviso that n+p=2, and m=1 to 5;
y=1 or 2, y+z=2 with the proviso that when w=0 then Y is —W—$R^3$—$W^1$—, or

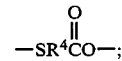

and in formula (XV) when z=1 and in formulas (XIII) and (XIV) at least one X or $X^1$ is —$SR^2$; and, $R^2$ is alkyl, alkenyl, aryl, aralkyl, cycloalkyl, cycloalkenyl,

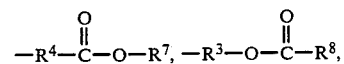

-continued

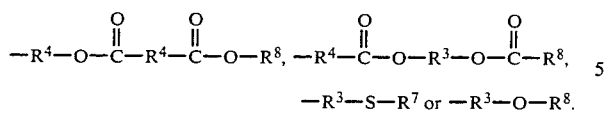
$-R^3-S-R^7$ or $-R^3-O-R^8$.

In a further embodiment of this invention, the stabilizer compositions comprise: (A) a mono-organotin compound or mixture of mono-organotin compounds selected from compounds having formula (I), (B) a mercaptan-containing compound or mixture of mercaptan-containing compounds selected from compounds having formula VI where $R^{15}$ and $R^{24}$ are the same or different and are

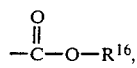

—OH, —SH, aryl, $C_1$ to $C_{18}$ alkyl, —OH or —H; compounds having formula VII where $R^{23}$ is

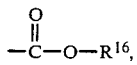

—SH, aryl, $C_1$ to $C_{18}$ alkyl, —OH, or —H; and/or compounds having formulas VIII, IX, X and/or XI; and optionally, (C) a diorganotin compound or mixture of diorganotin compounds selected from compounds having formulas XII, XIII, XIV and/or XV. Thus, the stabilizer compositions of this invention comprise:

A. a mono-organotin compound or mixture of mono-organotin compounds having the formula:

wherein
W and $W^1$ are the same or different and are oxygen or sulfur;
R is selected from alkyl, aryl, alkenyl, aralkyl, alkaryl, cycloalkyl, cycloalkenyl,

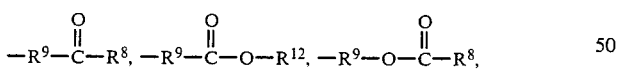

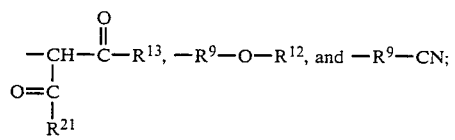

$R^8$ is alkyl, alkenyl, aryl, aralkyl, alkaryl, cycloalkyl, or cycloalkenyl;
$R^9$ is $C_1$ to $C_4$ alkylene;
$R^{12}$ is —H or a monovalent $C_1$ to $C_{20}$ hydrocarbon radical;
$R^{13}$ and $R^{21}$ are the same or different and are each $C_1$ to $C_{20}$ alkyl or $C_1$ to $C_{20}$ alkoxy;

B. a mercaptan-containing organic compound or mixture of mercaptan-containing organic compounds selected from compounds having the formulas:

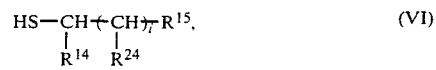

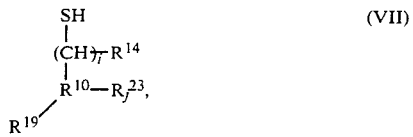

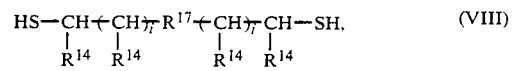

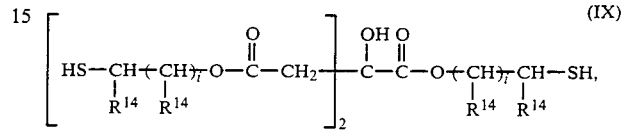

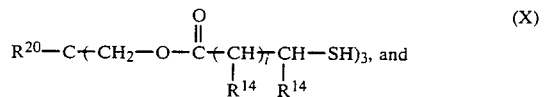

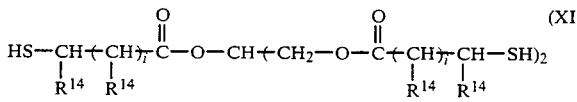

where
$R^{10}$ is cycloalkyl, cycloalkenyl or phenyl;
$R^{14}$ is —H, aryl, or $C_1$ to $C_{18}$ alkyl;
$R^{15}$ and $R^{24}$ are the same or different and are

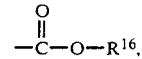

—OH, —SH, aryl, $C_1$ to $C_{18}$ alkyl, or —H;
$R^{16}$ is —H or $R^8$;
$R^{17}$ is

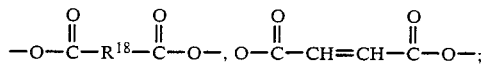

$R^{18}$ is arylene, $C_1$ to $C_8$ alkylene, or

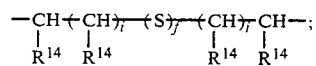

$R^{19}$ is —H or a divalent group which may contain halogen, hydroxy, mercapto or alkyl substituents and which when $R^{10}$ is phenyl combines with the phenyl to form a naphthalene ring;
$R^{20}$ is —$CH_3$, —$CH_2CH_3$, or

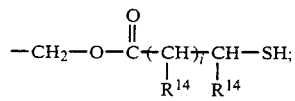

$R^{23}$ is

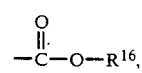

—SH, aryl, $C_1$ to $C_{18}$ alkyl, —OH or —H with the proviso that in formula (VII) when $R^{10}$ is phenyl, $R^{23}$ is —OH and i=0, then the —OH and —SH groups are on non-adjacent carbon atoms;

i=0 or an integer from 1 to 6 inclusive;

j=0, 1, 2 or 3; and f=1 or 2; and, optionally,

C. a diorganotin compound or mixture of diorganotin compounds selected from compounds having the formulas:

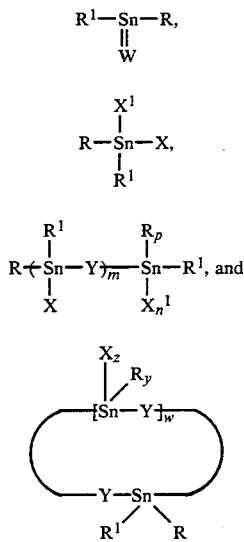

wherein

X and $X^1$ are the same or different and are selected from —$SR^2$,

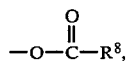

and O—$R^8$;

Y is

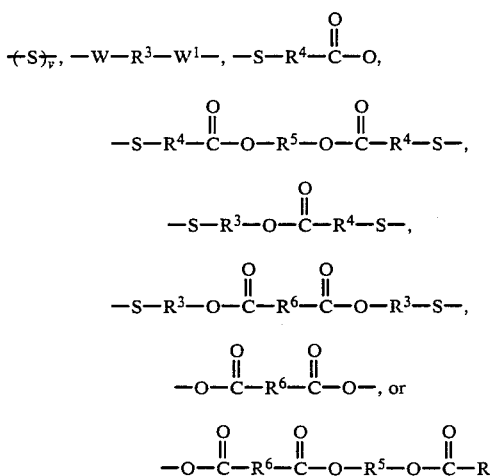

W is oxygen or sulfur;

R and $R^1$ are the same or different and are selected from alkyl, aryl, alkenyl, aralkyl, alkaryl, cycloalkyl, cycloalkenyl,

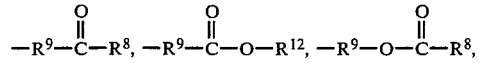

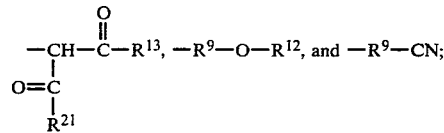

$R^2$ is alkyl, alkenyl, aryl, aralkyl, cycloalkyl, cycloalkenyl,

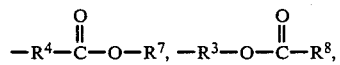

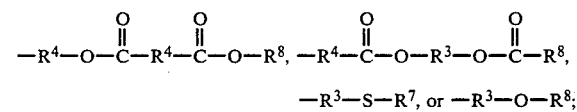

$R^3$ is alkylene of at least 2 carbon atoms, arylene, alkenylene of at least 2 carbon atoms, cycloalkylene, or cycloalkenylene;

$R^4$ is alkylene, arylene, alkenylene of at least 2 carbon atoms, cycloalkylene, or cycloalkenylene;

$R^5$ is $R^3$;

$R^6$ is nothing or $R^4$;

$R^7$ is —H or $R^8$;

$R^8$ is alkyl, alkenyl, aryl, aralkyl, alkaryl, cycloalkyl, or cycloalkenyl;

$R^9$ is $C_1$ to $C_4$ alkylene;

$R^{12}$ is —H or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy;

n=0, 1 or 2, p=0, 1 or 2 with the proviso that n+p=2, and m=1 to 5;

y=1 or 2, y+z=2 with the proviso that when w=0 then Y is —W—$R^3$—$W^1$—, or

and in formula (XV) when z=1 and in formulas (XIII) and (XIV) at least one X or $X^1$ is —$SR^2$.

In another embodiment of this invention, the stabilizer compositions comprise: (A) a mono-organotin compound or mixture of mono-organotin compounds selected from compounds having formula IIa; (B) a mercaptan-containing compound or mixture of mercaptan-containing compounds selected from compounds having formulas VI, VII, VIII, IX, X and/or XI; and, optionally, (C) a diorganotin compound or mixture of diorganotin compounds selected from compounds having formulas XII, XIII, XIV and/or XV. Thus, the stabilizer compositions of this embodiment comprise:

A. a mono-organotin compound or mixture of mono-organotin compounds having the formula:

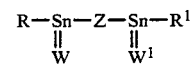

(IIa)

wherein

W and $W^1$ are the same or different and are oxygen or sulfur;

Z is $$-S-R^4-\overset{O}{\underset{\|}{C}}-O-R^5-O-\overset{O}{\underset{\|}{C}}-R^4-S-,$$

$$-S-R^3-O-\overset{O}{\underset{\|}{C}}-R^4-S-,$$

$$-S-R^3-O-\overset{O}{\underset{\|}{C}}-R^6-\overset{O}{\underset{\|}{C}}-O-R^3-S-;$$

R and $R^1$ are the same or different and are selected from alkyl aryl, alkenyl, aralkyl, alkaryl, cycloalkyl, cycloalkenyl $$-R^9-\overset{O}{\underset{\|}{C}}-R^8, \quad -R^9-\overset{O}{\underset{\|}{C}}-O-R^{12}, \quad -R^9-O-\overset{O}{\underset{\|}{C}}-R^8,$$

$$\begin{array}{c}-CH-\overset{O}{\underset{\|}{C}}-R^{13},\\ \;\;\;|\\ O=C\\ \;\;\;|\\ R^{21}\end{array}, -R^9-O-R^{12}, \text{ and } -R^9-CN;$$

$R^3$ is alkylene of at least 2 carbon atoms, arylene, alkenylene of at least 2 carbon atoms, cycloalkylene, or cycloalkenylene;

$R^4$ is alkylene, arylene, alkenylene of at least 2 carbon atoms, cycloalkylene, or cycloalkenylene;

$R^5$ is $R^3$;

$R^6$ is nothing or $R^4$;

$R^8$ is alkyl, alkenyl, aryl, aralkyl, alkaryl, cycloalkyl, or cycloalkenyl;

$R^9$ is $C_1$ to $C_4$ alkylene;

$R^{12}$ is —H or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy;

B. a mercaptan-containing organic compound or mixture of mercaptan-containing organic compounds selected from compounds having the formulas:

$$\text{HS}-\underset{R^{14}}{\underset{|}{CH}}\text{+CH}\overset{}{\underset{R^{24}}{\underset{|}{\text{)}_{i}}}}R^{15}, \tag{VI}$$

$$\begin{array}{c}\text{SH}\\ |\\ (\text{CH}\overset{}{\underset{}{)_{i}}}R^{14}\\ |\\ R^{10}-R_j^{23},\\ /\\ R^{19}\end{array} \tag{VII}$$

$$\text{HS}-\underset{R^{14}}{\underset{|}{CH}}\text{+CH}\overset{}{\underset{R^{14}}{\underset{|}{\text{)}_{i}}}}R^{17}\text{+CH}\overset{}{\underset{R^{14}}{\underset{|}{\text{)}_{i}}}}\underset{R^{14}}{\underset{|}{CH}}-\text{SH}, \tag{VIII}$$

$$\left[\text{HS}-\underset{R^{14}}{\underset{|}{CH}}\text{+CH}\overset{}{\underset{R^{14}}{\underset{|}{\text{)}_{i}}}}O-\overset{O}{\underset{\|}{C}}-CH_2\right]_2 \underset{}{\underset{}{\underset{|}{\overset{OH}{\;}}\overset{O}{\underset{\|}{C}}}}-C-O\text{+CH}\overset{}{\underset{R^{14}}{\underset{|}{\text{)}_{i}}}}\underset{R^{14}}{\underset{|}{CH}}-\text{SH}, \tag{IX}$$

$$R^{20}-\overset{O}{\underset{\|}{C}}\text{+CH}_2-O-\overset{O}{\underset{\|}{C}}\text{+CH}\overset{}{\underset{R^{14}}{\underset{|}{\text{)}_{i}}}}\underset{R^{14}}{\underset{|}{CH}}-\text{SH})_3, \text{ and} \tag{X}$$

$$\text{HS}-\underset{R^{14}}{\underset{|}{CH}}\text{+CH}_2\overset{}{\underset{}{)_{i}}}\overset{O}{\underset{\|}{C}}-O-CH\text{+CH}_2-O\overset{}{\underset{}{)_{i}}}\overset{O}{\underset{\|}{C}}\text{+CH}\overset{}{\underset{R^{14}}{\underset{|}{\text{)}_{i}}}}\underset{R^{14}}{\underset{|}{CH}}-\text{SH})_2 \tag{XI}$$

where $R^{10}$ is cycloalkyl, cycloalkenyl or phenyl;

$R^{14}$ is —H, aryl, or $C_1$ to $C_{18}$ alkyl;

$R^{15}$ and $R^{24}$ are the same or different and are $$-\overset{O}{\underset{\|}{C}}-O-R^{16}, -O-\overset{O}{\underset{\|}{C}}-R^{16},$$

—OH, —SH, aryl, $C_1$ to $C_{18}$ alkyl, or —H;

$R^{16}$ is —H or $R^8$;

$R^{17}$ is $$-O-\overset{O}{\underset{\|}{C}}-R^{18}-\overset{O}{\underset{\|}{C}}-O-, \text{ or } O-\overset{O}{\underset{\|}{C}}-CH=CH-\overset{O}{\underset{\|}{C}}-O-;$$

$R^{18}$ is arylene, $C_1$ to $C_8$ alkylene, or $$-\underset{R^{14}}{\underset{|}{CH}}\text{+CH}\overset{}{\underset{R^{14}}{\underset{|}{\text{)}_{i}}}}\text{+S}\overset{}{\underset{}{)_{j}}}\text{+CH}\overset{}{\underset{R^{14}}{\underset{|}{\text{)}_{i}}}}\underset{R^{14}}{\underset{|}{CH}}-;$$

$R^{19}$ is —H or a divalent group which may contain halogen, hydroxy, mercapto or alkyl substituents and which when $R^{10}$ is phenyl combines with the phenyl to form a naphthalene ring;

$R^{20}$ is —CH$_3$, —CH$_2$CH$_3$, or $$-CH_2-O-\overset{O}{\underset{\|}{C}}\text{+CH}\overset{}{\underset{R^{14}}{\underset{|}{\text{)}_{i}}}}\underset{R^{14}}{\underset{|}{CH}}-\text{SH};$$

$R^{23}$ is $$-\overset{O}{\underset{\|}{C}}-O-R^{16}, -O-\overset{O}{\underset{\|}{C}}-R^{16},$$

—SH, aryl, $C_1$ to $C_{18}$ alkyl, —OH or —H with the proviso that in formula (VII) when $R^{10}$ is phenyl, $R^{23}$ is —OH and i=0, then the —OH and —SH groups are on non-adjacent carbon atoms;

i=0 or an integer from 1 to 6 inclusive;

j=0, 1, 2 or 3; and f=1 or 2; and, optionally,

C. a diorganotin compound or mixture of diorganotin compounds selected from compounds having the formulas:

$$R^1-\underset{\underset{W}{\|}}{Sn}-R, \tag{XII}$$

$$R-\underset{\underset{R^1}{|}}{\overset{\overset{X^1}{|}}{Sn}}-X, \tag{XIII}$$

-continued

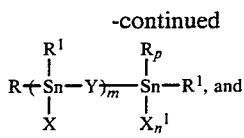
(XIV)

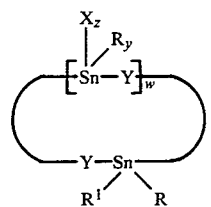
(XV)

wherein

X and $X^1$ are the same or different and are selected from $-SR^2$,

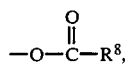

and $O-R^8$

Y is

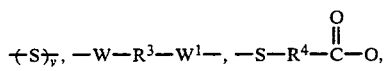

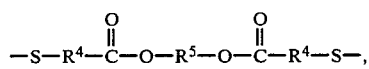

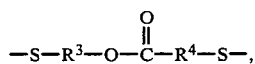

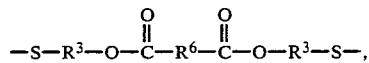

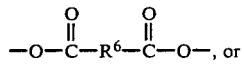

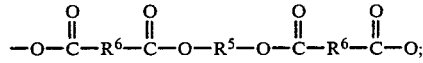

W is oxygen or sulfur;

R and $R^1$ are the same or different and are selected from alkyl, aryl, alkenyl, aralkyl, alkaryl, cycloalkyl, cycloalkenyl,

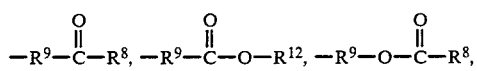

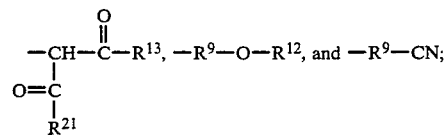

$R^2$ is alkyl, alkenyl, aryl, aralkyl, cycloalkyl, cycloalkenyl,

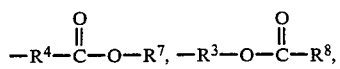

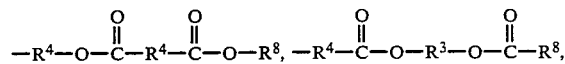

-continued

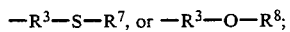

$R^3$ is alkylene of at least 2 carbon atoms, arylene, alkenylene of at least 2 carbon atoms, cycloalkylene, or cycloalkenylene;

$R^4$ is alkylene, arylene, alkenylene of at least 2 carbon atoms, cycloalkylene, or cycloalkenylene;

$R^5$ is $R^3$;

$R^6$ is nothing or $R^4$;

$R^7$ is $-H$ or $R^8$;

$R^8$ is alkyl, alkenyl, aryl, aralkyl, alkaryl, cycloalkyl, or cycloalkenyl;

$R^9$ is $C_1$ to $C_4$ alkylene;

$R^{12}$ is $-H$ or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy;

$n=0$, 1 or 2, $p=0$, 1 or 2 with the proviso that $n+p=2$, and $m=1$ to 5;

$y=1$ or 2, $y+z=2$ with the proviso that when $w=0$ then Y is $-W-R^3-W^1-$, or

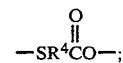

and in formula (XV) when $z=1$ and in formulas (XIII) and (XIV) at least one X or $X^1$ is $-SR^2$.

In an additional embodiment of this invention, the stabilizer compositions comprise: (A) a mono-organotin compound or mixture of mono-organotin compounds selected from compounds having formulas II, IIa, III, IV and/or V; (B) a mercaptan-containing organic compound or mixture of mercaptan-containing organic compounds selected from compounds having formula VIIa; and, optionally, (C) a diorganotin compound or mixture of diorganotin compounds selected from compounds having formulas XII, XIII, XIV and/or XV. Thus, the stabilizer compositions of this embodiment comprise:

A. a mono-organotin compound or mixture of mono-organotin compounds selected from compounds having the formulas:

 (II)

(IIa)

 (III)

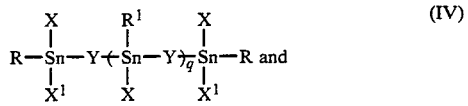 (IV)

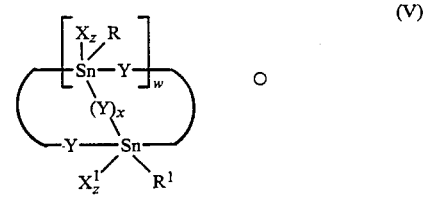 (V)

wherein

X and $X^1$ are the same or different and are selected from $-SR^2$,

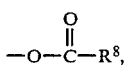

and $O-R^8$ with the proviso that in formula (V) when $z=1$ and in formulas (III) and (IV) at least one X or $X^1$ is $-SR^2$;

Y is

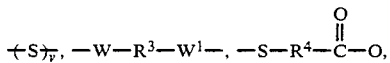

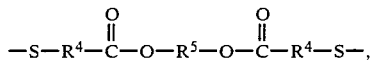

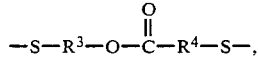

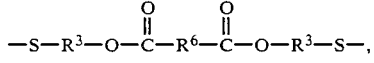

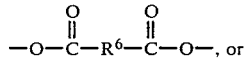

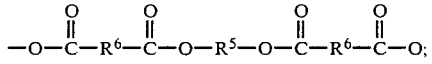

W and $W^1$ are the same or different and are oxygen or sulfur;

Z is

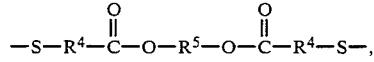

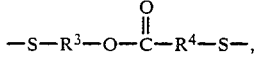

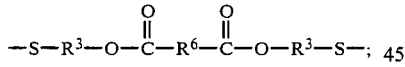

R and $R^1$ are the same or different and are selected from alkyl aryl, alkenyl, aralkyl, alkaryl, cycloalkyl, cycloalkenyl

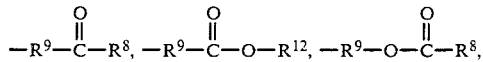

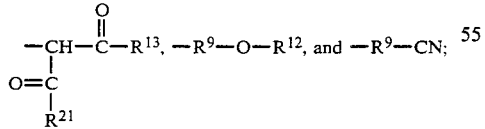

$R^2$ is alkyl, alkenyl, aryl, aralkyl, cycloalkyl, cycloalkenyl,

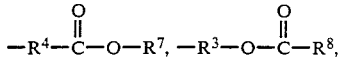

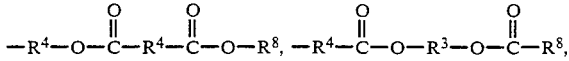

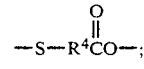

$R^3$ is alkylene of at least 2 carbon atoms, arylene, alkenylene of at least 2 carbon atoms, cycloalkylene, or cycloalkenylene;

$R^4$ is alkylene, arylene, alkenylene of at least 2 carbon atoms, cycloalkylene, or cycloalkenylene;

$R^5$ is $R^3$;

$R^6$ is nothing or $R^4$;

$R^7$ is $-H$ or $R^8$;

$R^8$ is alkyl, alkenyl, aryl, aralkyl, alkaryl, cycloalkyl, or cycloalkenyl;

$R^9$ is $C_1$ to $C_4$ alkylene;

$R^{12}$ is $-H$ or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy;

q=0 or an integer from 1 to 4 inclusive;

v=an integer from 1 to 8 inclusive; and w=0, 1 or 2, x=0 or 1, z=0 or 1 with the proviso that when x=0 then z=1, when x=1 then z=0 and w=1, when w=2 then x=0 and z=1, and when w=0 then x=0, z=1 and Y is $-W-R^3-W^1-$ or

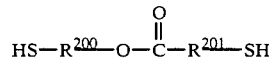

B. a mercaptan-containing organic compound or mixture of mercaptan-containing organic compounds selected from compounds having the formula:

$$HS-R^{200}-O-\overset{O}{\underset{\|}{C}}-R^{201}-SH \quad \text{(VIIa)}$$

where $R^{200}$ and $R^{201}$ are the same or different and are alkylene, alkenylene, arylene, cycloalkylene or cycloalkenylene; or alkylene, alkenylene, arylene, cycloalkylene or cycloalkenylene each substituted with one or two $-R$, $-O-R^7$, $-R^9-O-R^7$,

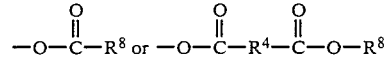

groups; R, $R^7$, $R^8$, $R^4$ and $R^9$ are as defined in component A above; and, optionally, C. a diorganotin compound or mixture of diorganotin compounds selected from compounds having the formulas:

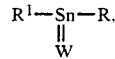

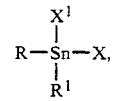

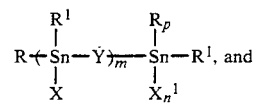

-continued

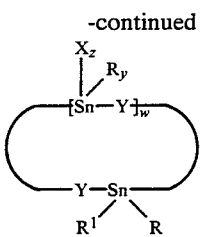
(XV)

R, R¹, W, X, X¹, Y, w and z are as defined in component A above;

n=0, 1 or 2, p=0, 1 or 2 with the proviso that n+p=2, and m=1 to 5;

y=1 or 2, y+z=2 with the proviso that when w=0 then Y is —W—R³—W¹—, or

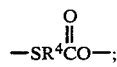

and in formula (XV) when z=1 and in formulas (XIII) and (XIV) at least one X or X¹ is —SR².

The stabilizer compositions of this invention may be prepared by blending the components thereof in any convenient manner which produces a homogeneous mixture, such as by shaking or stirring in a container. Likewise, the stabilizer compositions of this invention can be incorporated into the halogen-containing organic polymer by admixing the stabilizer composition and polymer, such as, for example, in an appropriate mill or mixer or by any other of the well-known methods which provide uniform distribution of the stabilizer throughout the polymer.

As previously stated, the stabilizer compositions of the present invention comprise (1) a mono-organotin compound or mixture of mono-organotin compounds, (2) a mercaptan-containing organic compound or mixture of mercaptan-containing compounds, and, optionally, (3) a diorganotin compound or mixture of diorganotin compounds. More particularly, the stabilizer compositions of this invention comprise from about 10% to about 60% by weight, preferably about 20% to about 40% by weight mercaptan-containing organic compound or mixture of mercaptan-containing organic compounds, based on the total weight of the stabilizer composition, the balance of the stabilizer composition comprising a mono-organotin compound or mixture of mono-organotin compounds, and, optionally, a diaorganotin compound or mixture of diorganotin compounds. Thus, when no diorganotin compound or mixture of diorganotin compounds is employed in the practice of this invention, the mono-organotin compound or mixture of mono-organotin compounds will comprise from about 40% to about 90% by weight, preferably about 60% to about 80% by weight of the total weight of the stabilizer composition. When it is desirable to utilize a diorganotin compound or mixture of diorganotin compounds in the practice of this invention, said diorganotin compound or mixture of diorganotin compounds may comprise from about 0.05% to about 75%, by weight, preferably from about 0.05% to about 35% by weight of the total weight of the stabilizer composition.

The stabilizer compositions of this invention are employed in an amount sufficient to impart the desired resistance to heat deterioration to halogen-containing organic polymers. It will be readily apparent to one of ordinary skill in the art, that the precise amount of stabilizer composition used will depend upon several factors, including, but not limited to, the particular halogen-containing organic polymer employed, the temperature to which the polymer will be subjected, and the possible presence of other stabilizing compounds. In general, the more severe the conditions to which the halogen-containing organic polymer is subjected, and the longer the term required for resisting degradation, the greater will be the amount of stabilizer composition required. Generally, as little as about 0.40 parts by weight of the stabilizer composition per hundred parts by weight of halogen-containing organic polymer will be effective. While there is no critical upper limit to the amount of stabilizer composition which can be employed, amounts in excess of about 10 parts by weight of stabilizer composition per hundred parts by weight of halogen-containing organic polymer do not give an increase in effectiveness commensurate with the additional amount of stabilizer employed.

The articles of manufacture contemplated by this invention are produced from the stabilized polymer compositions according to this invention. These articles of manufacture, e.g. pipe, may be formed from said stabilized polymer compositions by any of the well-known, conventional techniques for forming polymers into shaped articles of manufacture.

The following examples illustrate this invention. Unless otherwise indicated, all parts and percentages in the examples and throughout this specification are by weight.

EXAMPLES 1–4

Several mixtures are prepared by dry blending to 110° C. in a Henschel high intensity mixer (Model 2JSS) 100.0 parts of polyvinyl chloride (Geon 103EP-F-76 available commercially from B. F. Goodrich Chemical Company) with 3.0 parts of fine particle size calcium carbonate coated with calcium stearate, 1.0 part titanium dioxide, 1.2 parts paraffin wax (ADVAWAX ® 165 paraffin wax available commercially from Carstab Corporation), 0.60 part calcium stearate, 0.15 part of an oxidized low molecular weight ethylene homopolymer (AC629A available commercially from Allied Chemical Corporation), and each in turn of the stabilizer compositions listed in Table A in the amounts indicated in Table A, said amounts being parts by weight of stabilizer per hundred parts polyvinyl chloride. The resulting mixture is masticated on a two-roll mill at about 193° C. Samples are taken at one minute intervals beginning after the first introduction of the mix to the mill.

The appearance of each sample taken from the mill is evaluated using the following scale:

```
10   9 8 7    6   5    4 3 2    1    0
White ─────►Tan-Orange ─────►Burn
```

The results of these tests are indicated in Table A.

TABLE A

| Example No. | Stabilizer Composition | Parts By Weight | 1 | 2 | 3 | 4 | 5 | 6 | 7 | 8 | 9 | 10 |
|---|---|---|---|---|---|---|---|---|---|---|---|---|
| | | | | | | | COLOR | | | | | |
| 1 | Mono-organotin Cmpd. No. 3 from Table I | 0.40 | 10 | 9 | 8 | 7+ | 6 | 5 | 4 | 2 | 1 | 1 |
| | $HSCH_2CH_2\overset{O}{\overset{\|}{C}}OC_8H_{17}$ | 0.08 | | | | | | | | | | |
| 2 | Mono-organotin Cmpd. No. 7 from Table II | 0.40 | 10+ | 10+ | 9 | 9 | 8 | 8 | 7 | 6 | 4 | 2 |
| | $HSCH_2CH_2O\overset{O}{\overset{\|}{C}}C_{17}H_{33}$ | 0.20 | | | | | | | | | | |
| 3 | Mono-organotin Cmpd. No. 8 from Table III | 0.35 | 10+ | 10+ | 9 | 8+ | 8 | 7 | 6 | 5 | 3 | 2 |
| | $HSCH_2CH_2O\overset{O}{\overset{\|}{C}}C_{17}H_{35}$ | 0.10 | | | | | | | | | | |
| 4 | Mixture of equal wt. proportions of mono-organotin Cmpd. No. 1 from Table I and diorganotin Cmpd. D from Table VI | 0.30 | 9+ | 9 | 8 | 7 | 7 | 5 | 4 | 3 | 2 | 0 |
| | $HSCH_2CH_2CH_2O\overset{O}{\overset{\|}{C}}C_8H_{17}$ | 0.03 | | | | | | | | | | |

EXAMPLES 5-15

The stabilizer compositions indicated in Table B below are tested in the same manner and with substantially equivalent results as the stabilizer compositions of Examples 1-4.

TABLE B

| Example No. | Stabilizer Composition | Parts By Weight |
|---|---|---|
| 5 | Mono-organotin Cmpd. No. 10 from Table III | 0.50 |
| | $HSCH_2CH_2O\overset{O}{\overset{\|}{C}}(CH_2)_4\overset{O}{\overset{\|}{C}}OCH_2CH_2SH$ | 0.30 |
| 6a | Mixture of equal wt. proportions of mono-organotin Cmpd. No. 1 from Table I and diorganotin Cmpd. D from Table VI | 0.30 |
| | $HSCH_2CH_2CH_2O\overset{O}{\overset{\|}{C}}C_8H_{17}$ | 0.10 |
| 6b | Mixture of equal wt. proportions of mono-organotin Cmpd. No. 1 from Table I and diorganotin Cmpd. D from Table VI | 0.30 |
| | $HSCH_2CH_2OH$ | 0.10 |
| 6c | Mixture of equal wt. proportions of mono-organotin Cmpd. No. 1 from Table I and diorganotin Cmpd. D from Table VI | 0.30 |
| | $HSCH_2COOH$ | 0.05 |
| 7 | Mono-organotin Cmpd. No. 5 from Table I | 0.40 |
| | $HSCH_2CH_2\overset{O}{\overset{\|}{C}}OC_8H_{17}$ | 0.15 |
| 8 | $C_4H_9Sn(SC_{12}H_{25})_3$ | 0.50 |
| | $HSCH_2CH_2O\overset{O}{\overset{\|}{C}}C_{17}H_{35}$ | 0.15 |
| 9 | $C_4H_9Sn(SC_{12}H_{35})_3$ | 0.50 |
| | $HSCH_2CH_2O\overset{O}{\overset{\|}{C}}C_{17}H_{35}$ | 0.15 |
| | Diorganotin cmpd. F from Table VII | 0.10 |

TABLE B-continued

| Example No. | Stabilizer Composition | Parts By Weight |
|---|---|---|
| 10 | Mono-organotin cmpd. No. 5b from Table Ia | 0.35 |
| | $HSCH_2CH_2OC(CH_2)_4COCH_2CH_2SH$ (with two C=O groups) | 0.05 |
| 11 | Mono-organotin cmpd. No. 5b from Table Ia | 0.35 |
| | $HSCH_2CH_2OC(CH_2)_4COCH_2CH_2SH$ (with two C=O groups) | 0.05 |
| | Diorganotin cmpd. B from Table V | 0.02 |
| 12 | Mono-organotin cmpd. No. 5a from Table Ia | 0.25 |
| | $CH_3CH_2C(CH_2OCCH_2SH)_3$ (with C=O) | 0.10 |
| 13 | Mono-organotin cmpd. No. 5c from Table Ia | 0.375 |
| | HS—⟨phenyl⟩—OCCH$_2$CH$_2$SH (with C=O) | 0.20 |
| 14 | Mono-organotin cmpd. No. 5c from Table Ia | 0.375 |
| | HS—⟨phenyl⟩—OCCH$_2$CH$_2$SH (with C=O) | 0.20 |
| | Diorganotin cmpd. C from Table VI | 0.25 |
| 15 | $CH_3-Sn-SCH_2CO(CH_2)_4OCCH_2S-Sn-CH_3$ with $(SCH_2CH_2OCC_{17}H_{33})_2$ groups on each Sn | 0.22 |
| | $HSCH_2CHCH_2OCCHSH$ with OH and $CH_3$ substituents | 0.17 |

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while a few specific embodiments of this invention have been described in considerable detail, variations and modifications of these embodiments can be effected without departing from the spirit and scope of the invention as disclosed and claimed.

What we claim and desire to protect by Letters Patent is:

1. A composition for stabilizing halogen-containing organic polymers against the deteriorative effects of heat said composition consisting essentially of the product produced by blending:

A. a mono-organo compound or mixture of mono-organotin compounds having the formula:

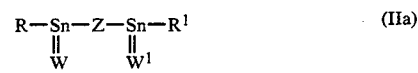

wherein
W and $W^1$ are the same or different and are oxygen or sulfur;
Z is

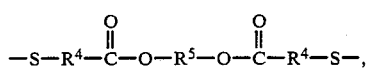

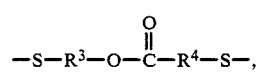

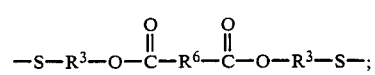

R and $R^1$ are the same or different and are selected from alkyl aryl, alkenyl, aralkyl, alkaryl, cycloalkyl, cycloalkenyl

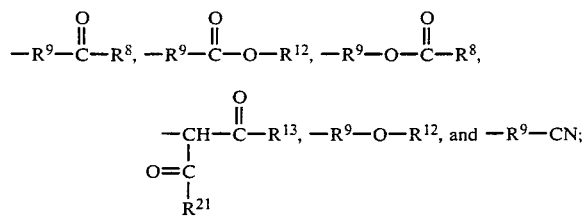

5

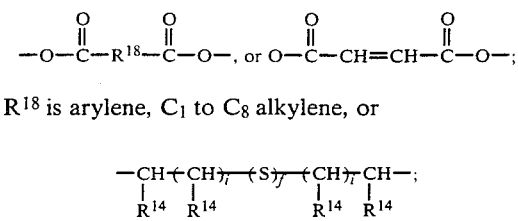

$R^{18}$ is arylene, $C_1$ to $C_8$ alkylene, or

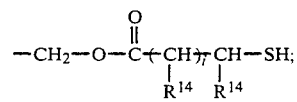

$R^{19}$ is —H or when $R^{10}$ is phenyl may be a divalent group which may contain halogen, hydroxy, mercapto or alkyl substituents and which combines with the phenyl to form a naphthalene ring;

$R^{20}$ is —$CH_3$, —$CH_2CH_3$, or

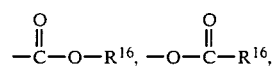

$R^{23}$ is

10

$R^3$ is alkylene of at least 2 carbon atoms, arylene, alkenylene of at least 2 carbon atoms, cycloalkylene, or cycloalkenylene;

$R^4$ is alkylene, arylene, alkenylene of at least 2 carbon atoms, cycloalkylene, or cycloalkenylene;

$R^5$ is $R^3$;

$R^6$ is nothing or $R^4$;

$R^8$ is alkyl, alkenyl, aryl, aralkyl, alkaryl, cycloalkyl, or cycloalkenyl;

$R^9$ is $C_1$ to $C_4$ alkylene;

$R^{12}$ is —H or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy;

B. in a synergistically effective amount, a mercaptan-containing organic compounds selected from compounds having the formulas:

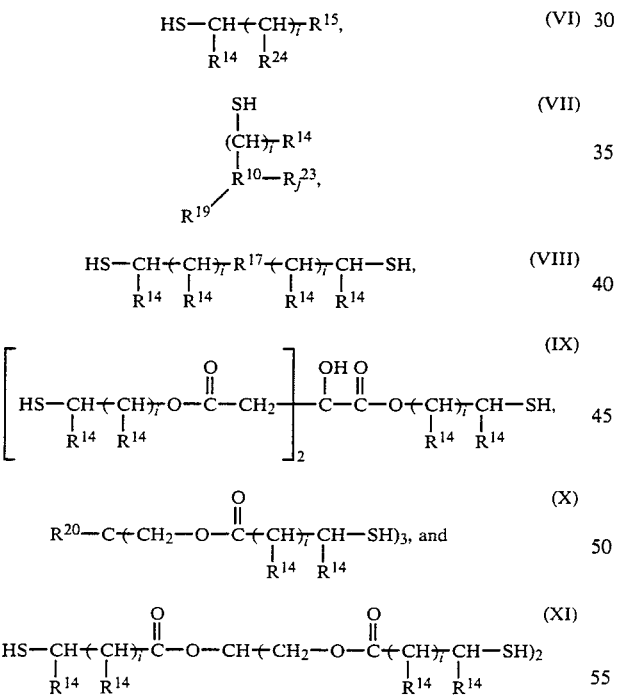

wherein:

$R^{10}$ is cycloalkyl, cycloalkenyl or phenyl;

$R^{14}$ is —H, aryl, or $C_1$ to $C_{18}$ alkyl;

$R^{15}$ and $R^{24}$ are the same or different and are

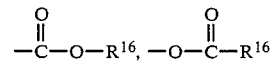

—OH, —SH, aryl, $C_1$ to $C_{18}$ alkyl, or —H;

$R^{16}$ is $R^8$;

$R^{17}$ is

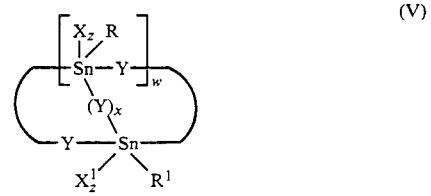

—SH, aryl, $C_1$ to $C_{18}$ alkyl, —OH or —H with the proviso that in formula (VII) when $R^{10}$ is phenyl, $R^{23}$ is —OH and i=0, then the —OH and —SH groups are on nonadjacent carbon atoms;

i=0 or an integer from 1 to 6 inclusive;

j=0, 1, 2 or 3; and f=1 or 2.

2. A composition for stabilizing halogen-containing organic polymers against the deteriorative effects of heat, said composition consisting essentially of the product produced by blending:

A. a mono-organotin compound or mixture of mono-organotin compounds selected from compounds having the formulas:

 (II)

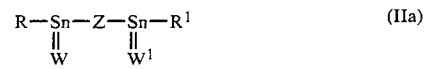 (IIa)

 (III)

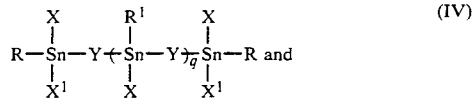 (IV)

(V)

wherein

X and $X^1$ are the same or different and are selected from —$SR^2$,

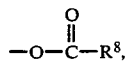

and O—R$^8$ with the proviso that in formula (V) when z=1 and in formulas (III) and (IV) at least one X or X$^1$ is —SR$^2$;

Y is

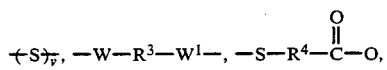

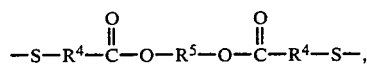

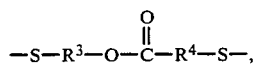

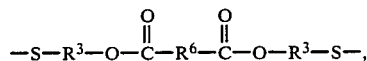

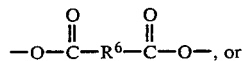

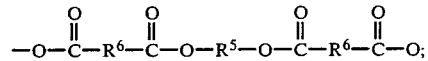

W and W$^1$ are the same or different and are oxygen or sulfur;

Z is

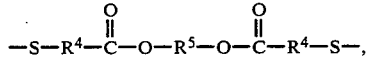

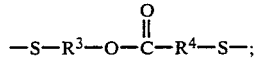

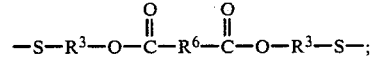

R and R$^1$ are the same or different and are selected from alkyl aryl, alkenyl, aralkyl, alkaryl, cycloalkyl, cycloalkenyl,

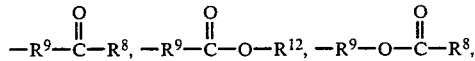

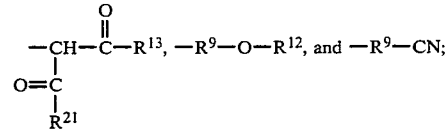

R$^2$ is alkyl, alkenyl, aryl, aralkyl, cycloalkyl, cycloalkenyl,

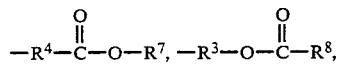

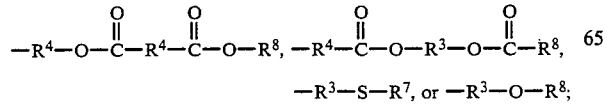

—R$^3$—S—R$^7$, or —R$^3$—O—R$^8$;

R$^3$ is alkylene of at least 2 carbon atoms, arylene, alkenylene of at least 2 carbon atoms, cycloalkylene, or cycloalkenylene;

R$^4$ is alkylene, arylene, alkenylene of at least 2 carbon atoms, cycloalkylene, or cycloalkenylene;

R$^5$ is R$^3$;

R$^6$ is nothing or R$^4$;

R$^7$ is —H or R$^8$;

R$^8$ is alkyl, alkenyl, aryl, aralkyl, alkaryl, cycloalkyl, or cycloalkenyl;

R$^9$ is C$_1$ to C$_4$ alkylene;

R$^{12}$ is —H or a monovalent C$_1$ to $_{20}$ hydrocarbon radical;

R$^{13}$ and R$^{21}$ are the same or different and are each C$_1$ to C$_{20}$ alkyl or C$_1$ to C$_{20}$ alkoxy;

q=0 or an integer from 1 to 4 inclusive;

v=an integer from 1 to 8 inclusive; and w=0, 1 or 2, x=0 or 1, z=0 or 1 with the proviso that when x=0 then z=1, when x=1 then z=0 and w=1, when w=2 then x=0 and z=1, and when w=0 then x=0, z=1 and Y is —W—R$^3$—W$^1$— or

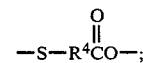

and

B. in a synergistically effective amount, a mercaptan-containing organic compounds selected from compounds having the formula:

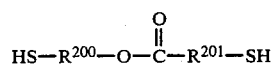 (VIIIa)

where

R$^{200}$ and R$^{201}$ are the same or different and are alkylene, alkenylene, arylene, cycloalkylene or cycloalkenylene; or alkylene, alkenylene, arylene, cycloalkylene or cycloalkenylene each substituted with one or two —R, —O—R$^7$, —R$^9$—O—R$^7$,

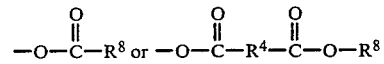

groups; R, R$^7$, R$^8$, R$^4$ and R$^9$ are as defined in component A above.

3. A composition according to claim 1 or 2 further comprising a diorganotin compound or mixture of diorganotin compounds having the formulas:

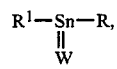 (XII)

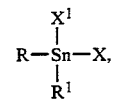 (XIII)

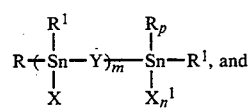 (XIV)

-continued

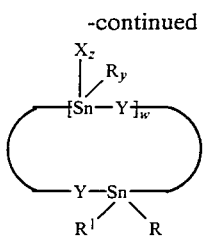
(XV)

wherein
X and $X^1$ are the same or different and are selected from $-SR^2$,

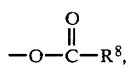

and $O-R^8$;
Y is

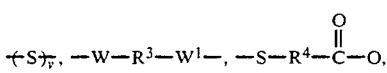

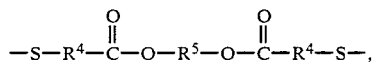

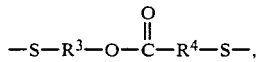

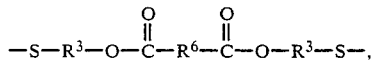

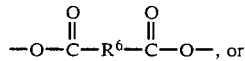

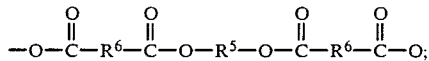

W is oxygen or sulfur;
R and $R^1$ are the same or different and are selected from alkyl, aryl, alkenyl, aralkyl, alkaryl, cycloalkyl, cycloalkenyl,

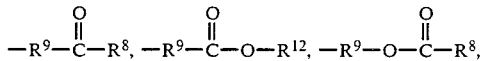

-continued

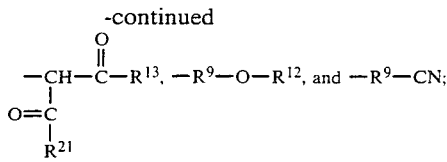

$R^2$ is alkyl, alkenyl, aryl, aralkyl, cycloalkyl, cycloalkenyl, $-R^4-\overset{O}{\underset{\|}{C}}-O-R^7, -R^3-O-\overset{O}{\underset{\|}{C}}-R^8,$ $-R^4-O-\overset{O}{\underset{\|}{C}}-R^4-\overset{O}{\underset{\|}{C}}-O-R^8, -R^4-\overset{O}{\underset{\|}{C}}-O-R^3-O-\overset{O}{\underset{\|}{C}}-R^8,$ $-R^3-S-R^7$, or $-R^3-O-R^8$;

$R^3$ is alkylene of at least 2 carbon atoms, arylene, alkenylene of at least 2 carbon atoms, cycloalkylene, or cycloalkenylene;

$R^4$ is alkylene, arylene, alkenylene of at least 2 carbon atoms, cycloalkylene, or cycloalkenylene;

$R^5$ is $R^3$;
$R^6$ is nothing or $R^4$;
$R^7$ is $-H$ or $R^8$;
$R^8$ is alkyl, alkenyl, aryl, aralkyl, alkaryl, cycloalkyl, or cycloalkenyl;
$R^9$ is $C_1$ to $C_4$ alkylene;
$R^{12}$ is $-H$ or a monovalent $C_1$ to $C_{20}$ hydrocarbon radical;
$R^{13}$ and $R^{21}$ are the same or different and are each $C_1$ to $C_{20}$ alkyl or $C_1$ to $C_{20}$ alkoxy;
$n=0$, 1 or 2, $p=0$, 1 or 2 with the proviso that $n+p=2$, and $m=1$ to 5;
$y=1$ or 2, $y+z=2$ with the proviso that when $w=0$ then Y is $-W-R^3-W^1-$, or

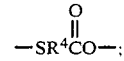

and in formula (XV) when $z=1$ and in formulas (XIII) and (XIV) at least one X or $X^1$ is $-SR^2$.

4. A polymer composition stabilized against the deteriorative effects of heat comprising a halogen-containing organic polymer and a stabilizing amount of the composition of claim 3.

5. A polymer composition stabilized against the deteriorative effects of heat comprising a halogen-containing organic polymer and a stabilizing amount of the composition of claim 1 or 2.

* * * * *